US012556251B2

(12) United States Patent
Ghanbarinejad et al.

(10) Patent No.: US 12,556,251 B2
(45) Date of Patent: Feb. 17, 2026

(54) MEASURING RESOURCES BASED ON A CRITERION

(71) Applicant: Lenovo (Singapore) Pte. Ltd., New Tech Park (SG)

(72) Inventors: Majid Ghanbarinejad, Chicago, IL (US); Vijay Nangia, Woodridge, IL (US); Ahmed Monier Ibrahim Saleh Hindy, Aurora, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 377 days.

(21) Appl. No.: 18/027,880

(22) PCT Filed: Sep. 21, 2021

(86) PCT No.: PCT/IB2021/058605
§ 371 (c)(1),
(2) Date: Mar. 22, 2023

(87) PCT Pub. No.: WO2022/064367
PCT Pub. Date: Mar. 31, 2022

(65) Prior Publication Data

US 2023/0379024 A1 Nov. 23, 2023

Related U.S. Application Data

(60) Provisional application No. 63/081,839, filed on Sep. 22, 2020.

(51) Int. Cl.
*H04W 72/02* (2009.01)
*H04B 7/06* (2006.01)

(52) U.S. Cl.
CPC .......... *H04B 7/0626* (2013.01); *H04W 72/02* (2013.01)

(58) Field of Classification Search
CPC .............................. H04B 7/0626; H04W 72/02
See application file for complete search history.

(56) References Cited

U.S. PATENT DOCUMENTS

| | | | | |
|---|---|---|---|---|
| 2013/0148611 A1* | 6/2013 | Moulsley | ............... | H04W 72/23 370/329 |
| 2013/0242787 A1* | 9/2013 | Sun | ....................... | H04W 24/10 370/252 |

(Continued)

FOREIGN PATENT DOCUMENTS

| | | | | |
|---|---|---|---|---|
| EP | 3461201 A1 | 3/2019 | | |
| WO | 2012028204 A1 | 3/2012 | | |
| WO | WO-2020163610 A1 * | 8/2020 | ............. | H04L 5/005 |

OTHER PUBLICATIONS

PCT/IB2021/058605, "Notification of Transmittal of the International Search Report and the Written Opinion of the International Searching Authority, or the Declaration", International Searching Authority, Dec. 23, 2021, pp. 1-16.

(Continued)

*Primary Examiner* — Fahmida S Chowdhury
(74) *Attorney, Agent, or Firm* — Kunzler Needham & Hilton

(57) ABSTRACT

Apparatuses, methods, and systems are disclosed for measuring resources based on a criterion. One method includes receiving, at a wireless device, a first configuration including information indicating a first set of resources. The method includes receiving a second configuration including information indicating an association with the first configuration and a set of at least one criterion parameter. The method includes performing a measurement corresponding to the first set of resources. The method includes determining whether a criterion of the measurement is satisfied. The criterion is determined according to the set of at least one criterion parameter. The method includes, in response to (Continued)

determining that the criterion of the measurement is satisfied, transmitting a control message according to the second configuration. The control message includes a field based on the measurement.

16 Claims, 17 Drawing Sheets

(56) References Cited

U.S. PATENT DOCUMENTS

| | | | | |
|---|---|---|---|---|
| 2013/0322376 | A1* | 12/2013 | Marinier | H04L 1/0027 370/329 |
| 2014/0314038 | A1* | 10/2014 | Seo | H04L 25/0226 370/329 |
| 2015/0189644 | A1* | 7/2015 | Lorca Hernando | H04L 5/0055 370/329 |
| 2022/0263552 | A1* | 8/2022 | Hao | H04B 7/0482 |
| 2023/0060481 | A1* | 3/2023 | Yuan | H04L 5/0057 |
| 2023/0379024 | A1* | 11/2023 | Ghanbarinejad | H04B 7/0626 |

OTHER PUBLICATIONS

CATT, "Mobility Issue for NTN System", 3GPP TSG-RAN WG2 Meeting #104 R2-1816281, Nov. 12-16, 2018, pp. 1-4.

Thales, "Solutions for NR to support non-terrestrial networks (NTN)", 3GPP TSG RAN meeting #86 RP-193234, Dec. 9-13, 2019, pp. 1-10.

3GPP, "3rd Generation Partnership Project; Technical Specification Group Radio Access Network; Solutions for NR to support non-terrestrial networks (NTN) (Release 16)", 3GPP TR 38.821 V16.0.0, Dec. 2019, pp. 1-140.

3GPP, "3rd Generation Partnership Project; Technical Specification Group Radio Access Network; NR; Physical layer procedures for data (Release 16)", 3GPP TS 38.214 V16.2.0, Jun. 2020, pp. 1-163.

3GPP, "3rd Generation Partnership Project; Technical Specification Group Radio Access Network; NR; Medium Access Control (MAC) protocol specification (Release 16)", 3GPP TS 38.321 V16.1.0, Jul. 2020, pp. 1-151.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

* cited by examiner

MEASURING RESOURCES BASED ON A CRITERION

CROSS-REFERENCE TO RELATED APPLICATIONS

This application claims priority to U.S. Patent Application Ser. No. 63/081,839 entitled "APPARATUSES, METHODS, AND SYSTEMS FOR UE-TRIGGERED CSI REPORTING IN NON-TERRESTRIAL NETWORKS" and filed on Sep. 22, 2020 for Majid Ghanbarinejad, which is incorporated herein by reference in its entirety.

FIELD

The subject matter disclosed herein relates generally to wireless communications and more particularly relates to measuring resources based on a criterion.

BACKGROUND

In certain wireless communications networks, reporting may be inefficient. In such networks, the reporting may be made periodically whether it is needed or not.

BRIEF SUMMARY

Methods for measuring resources based on a criterion are disclosed. Apparatuses and systems also perform the functions of the methods. One embodiment of a method includes receiving, at a wireless device, a first configuration including information indicating a first set of resources. In some embodiments, the method includes receiving a second configuration including information indicating an association with the first configuration and a set of at least one criterion parameter. In certain embodiments, the method includes performing a measurement corresponding to the first set of resources. In various embodiments, the method includes determining whether a criterion of the measurement is satisfied. The criterion is determined according to the set of at least one criterion parameter. In some embodiments, the method includes, in response to determining that the criterion of the measurement is satisfied, transmitting a control message according to the second configuration. The control message includes a field based on the measurement.

One apparatus for measuring resources based on a criterion includes a wireless device. In some embodiments, the apparatus includes a receiver that: receives a first configuration including information indicating a first set of resources; and receives a second configuration including information indicating an association with the first configuration and a set of at least one criterion parameter. In various embodiments, the apparatus includes a processor that: performs a measurement corresponding to the first set of resources; and determines whether a criterion of the measurement is satisfied. The criterion is determined according to the set of at least one criterion parameter. In certain embodiments, the apparatus includes a transmitter that, in response to determining that the criterion of the measurement is satisfied, transmits a control message according to the second configuration. The control message includes a field based on the measurement.

Another embodiment of a method for measuring resources based on a criterion includes receiving, at a wireless device, a first configuration including information indicating a first set of resources for a channel state information measurement. In some embodiments, the method includes receiving a second configuration including information indicating a second set of resources for a criterion evaluation. In certain embodiments, the method includes receiving a third configuration including information indicating an association with the first set of resources and a set of at least one criterion parameter associated with the second set of resources. In various embodiments, the method includes performing a first measurement corresponding to the second set of resources. In some embodiments, the method includes determining whether a criterion of the first measurement is satisfied based on the set of at least one criterion parameter. In certain embodiments, the method includes, in response to determining that the criterion of the first measurement is satisfied: performing a second measurement corresponding to the first set of resources; and transmitting a channel state information report based on the second configuration.

Another apparatus for measuring resources based on a criterion includes a wireless device. In some embodiments, the apparatus includes a receiver that: receives a first configuration including information indicating a first set of resources for a channel state information measurement; receives a second configuration including information indicating a second set of resources for a criterion evaluation; and receives a third configuration including information indicating an association with the first set of resources and a set of at least one criterion parameter associated with the second set of resources. In various embodiments, the apparatus includes a processor that: performs a first measurement corresponding to the second set of resources; and determines whether a criterion of the first measurement is satisfied based on the set of at least one criterion parameter. In certain embodiments, the apparatus includes a transmitter. In some embodiments, in response to the processor determining that the criterion of the first measurement is satisfied: the processor performs a second measurement corresponding to the first set of resources; and the transmitter transmits a channel state information report based on the second configuration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
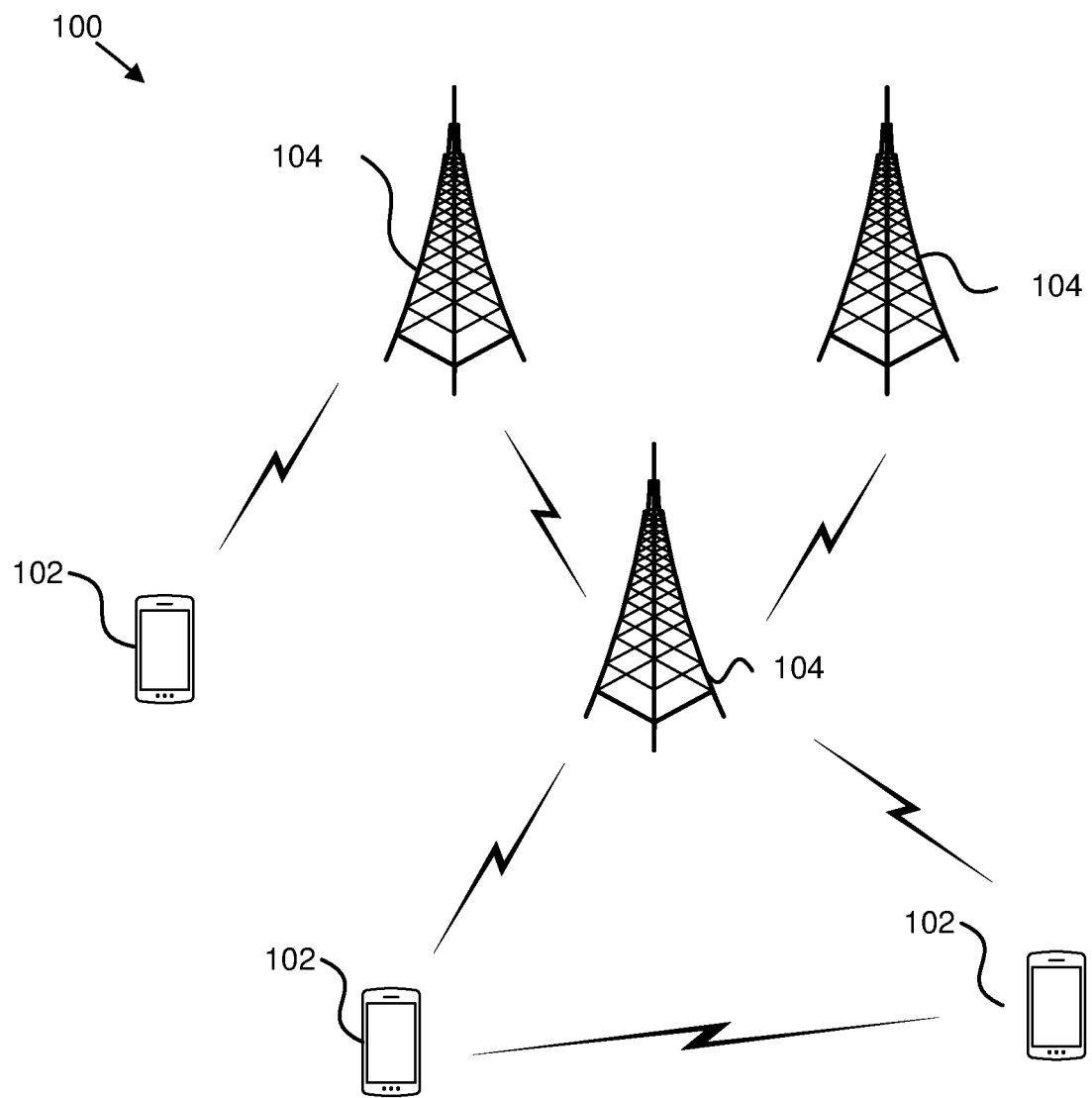
FIG. 1 is a schematic block diagram illustrating one embodiment of a wireless communication system for measuring resources based on a criterion.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for measuring resources based on a criterion. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, at a wireless device, a first configuration including information indicating a first set of resources. In some embodiments, the remote unit 102 may receive a second configuration including information indicating an association with the first configuration and a set of at least one criterion parameter. In certain embodiments, the remote unit 102 may perform a measurement corresponding to the first set of resources. In various embodiments, the remote unit 102 may determine whether a criterion of the measurement is satisfied. The criterion is determined according to the set of at least one criterion parameter. In some embodiments, the remote unit 102 may, in response to determining that the criterion of the measurement is satisfied, transmit a control message according to the second configuration. The control message includes a field based on the measurement. Accordingly, the remote unit 102 may be used for measuring resources based on a criterion.

In certain embodiments, a remote unit 102 may receive, at a wireless device, a first configuration including information indicating a first set of resources for a channel state information measurement. In some embodiments, the remote unit 102 may receive a second configuration including information indicating a second set of resources for a criterion evaluation. In certain embodiments, the remote unit 102 may receive a third configuration including information indicating an association with the first set of resources and a set of at least one criterion parameter associated with the second set of resources. In various embodiments, the remote unit 102 may perform a first measurement corresponding to the second set of resources. In some embodiments, the remote unit 102 may determine whether a criterion of the first measurement is satisfied based on the set of at least one criterion parameter. In certain embodiments, the remote unit 102 may, in response to determining that the criterion of the first measurement is satisfied: perform a second measurement corresponding to the first set of resources; and transmit a channel state information report based on the second configuration. Accordingly, the remote unit 102 may be used for measuring resources based on a criterion.

Figure 2:
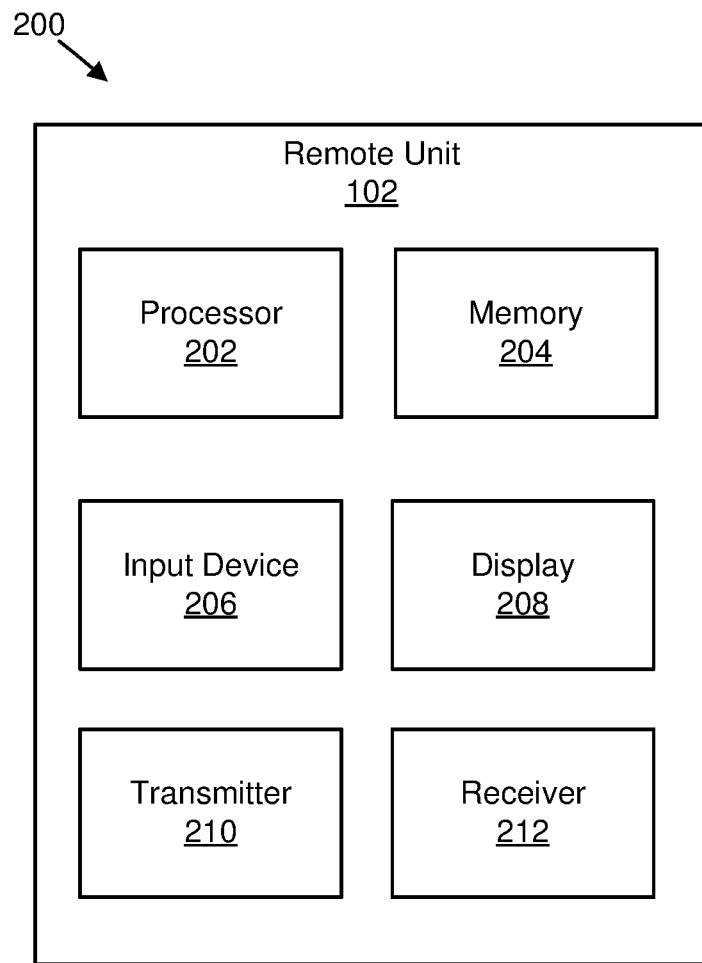
FIG. 2 is a schematic block diagram illustrating one embodiment of an apparatus that may be used for measuring resources based on a criterion.

FIG. 2 depicts one embodiment of an apparatus 200 that may be used for measuring resources based on a criterion. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212: receives a first configuration including information indicating a first set of resources; and receives a second configuration including information indicating an association with the first configuration and a set of at least one criterion parameter. In various embodiments, the processor 202: performs a measurement corresponding to the first set of resources; and determines whether a criterion of the measurement is satisfied. The criterion is determined according to the set of at least one criterion parameter. In certain embodiments, the transmitter 210, in response to determining that the criterion of the measurement is satisfied, transmits a control message according to the second configuration. The control message includes a field based on the measurement.

In some embodiments, the receiver 212: receives a first configuration including information indicating a first set of resources for a channel state information measurement; receives a second configuration including information indicating a second set of resources for a criterion evaluation; and receives a third configuration including information indicating an association with the first set of resources and a set of at least one criterion parameter associated with the second set of resources. In various embodiments, the processor 202: performs a first measurement corresponding to the second set of resources; and determines whether a criterion of the first measurement is satisfied based on the set of at least one criterion parameter. In some embodiments, in response to the processor determining that the criterion of the first measurement is satisfied: the processor 202 performs a second measurement corresponding to the first set of resources; and the transmitter 210 transmits a channel state information report based on the second configuration.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
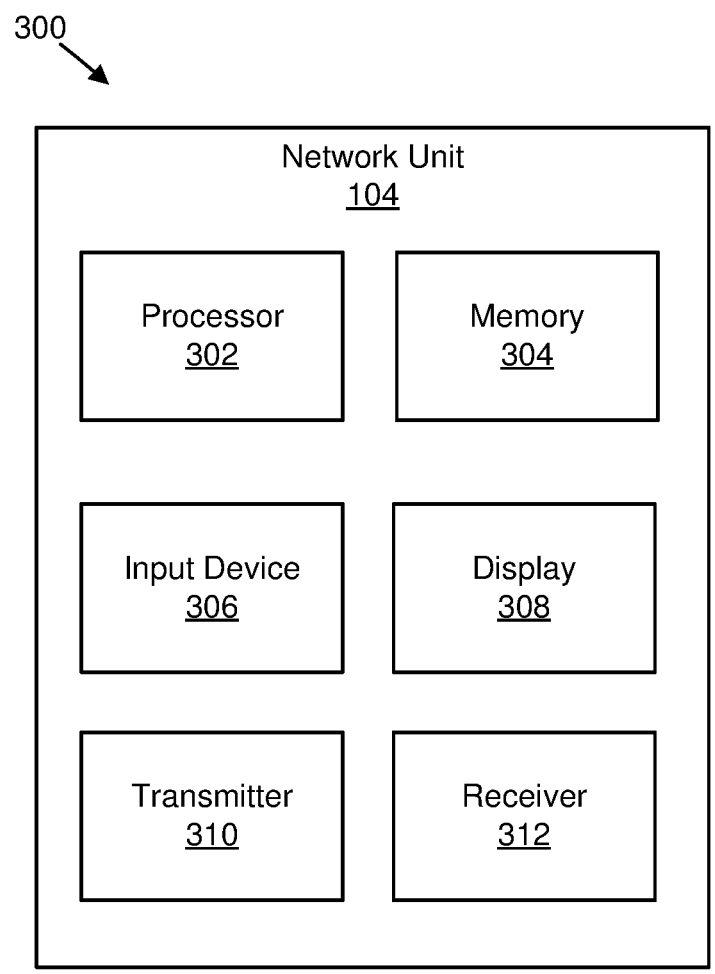
FIG. 3 is a schematic block diagram illustrating one embodiment of an apparatus that may be used for measuring resources based on a criterion.

FIG. 3 depicts one embodiment of an apparatus 300 that may be used for measuring resources based on a criterion. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Figure 4:
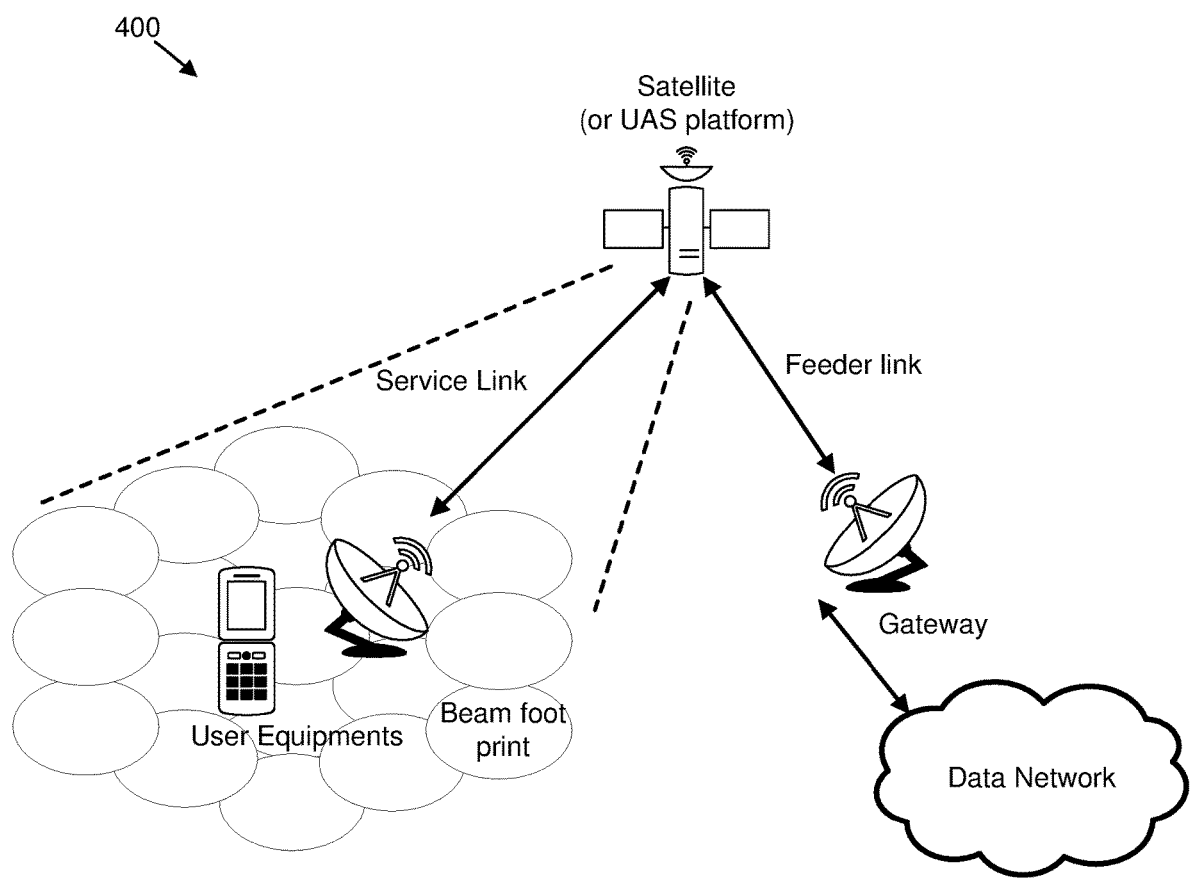
FIG. 4 is a schematic block diagram illustrating one embodiment of a non-terrestrial network.

FIG. 4 is a schematic block diagram illustrating one embodiment of a non-terrestrial ("NTN") network 400. In FIG. 4, an airborne or spaceborne transmit-receive point ("TRP"), which may be called a non-terrestrial transmit-receive point ("NT-TRP"), provides network connectivity for a user equipment ("UE") (e.g., antenna, mobile phone) via a "service link" and a "feeder link." For geostationary orbit ("GEO") satellites and other non-terrestrial TRPs (e.g., unmanned aerial system ("UAS") platform), channel state information may not change rapidly; therefore, the system may have sufficient time to perform channel state information ("CSI") measurement and reporting employing methods similar to terrestrial networks.

In some networks, because of the high speed of low-earth orbit ("LEO") satellites (and possibly similar fast-moving NT-TRPs), CSI may change rapidly depending on factors such as a scattering environment around the UE. In such embodiments, a continuous flow of CSI reports from the UE may be made. Moreover, in such embodiments, by allocating a larger set of resources to measurement and reporting, and because the UE may not experience rapid CSI changes despite the high velocity of the NT-TRP, resources may be wasted. Furthermore, if a network triggers an aperiodic measurement and/or reporting for a UE, an excessive round-trip delay ("RTD") may be prohibitive of a rapid CSI update at the NT-TRP.

In various networks, a new radio ("NR") standard limits reporting of Type II codebooks to aperiodic reporting as the payload may be too large for a periodic or semi-persistent reporting. That may impose limits on the performance of an NTN in which the RTD for transmitting a triggering downlink control information ("DCI") and receiving an aperiodic CSI report may be prohibitive or otherwise may degrade performance.

In certain embodiments, CSI may be measured and reported in an NTN. In such embodiments, am airborne or spaceborne communication entity that provides a service link to a UE may be an NT-TRP. It should be noted that the functionalities and the protocol stack implemented in the NT-TRP may be different in different scenarios (e.g., in systems based on a transparent payload versus a regenerative payload). Communications from the UE to the NT-TRP may be referred to as uplink and communications from the NT-TRP to the UE may be referred to as downlink.

Figure 5:
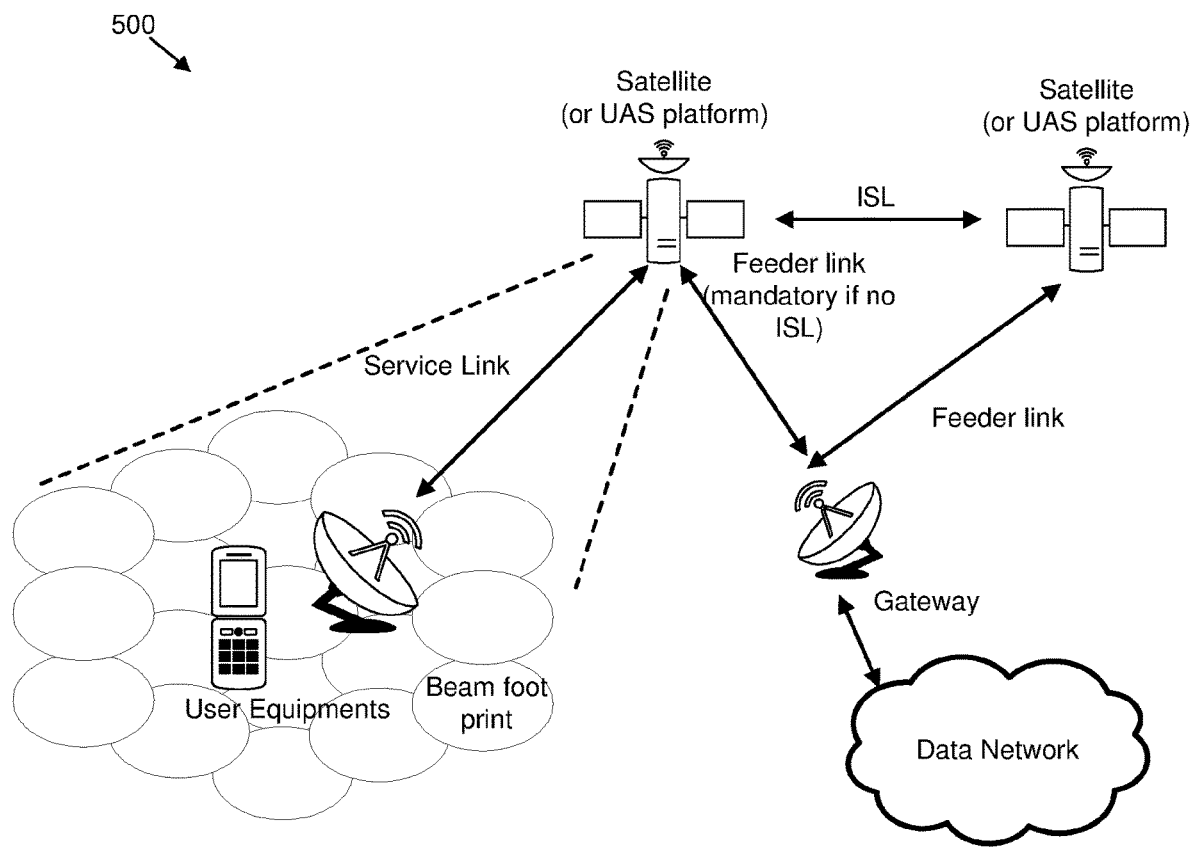
FIG. 5 is a schematic block diagram illustrating one embodiment of a non-terrestrial network based on a regenerative payload.
Figure 6:
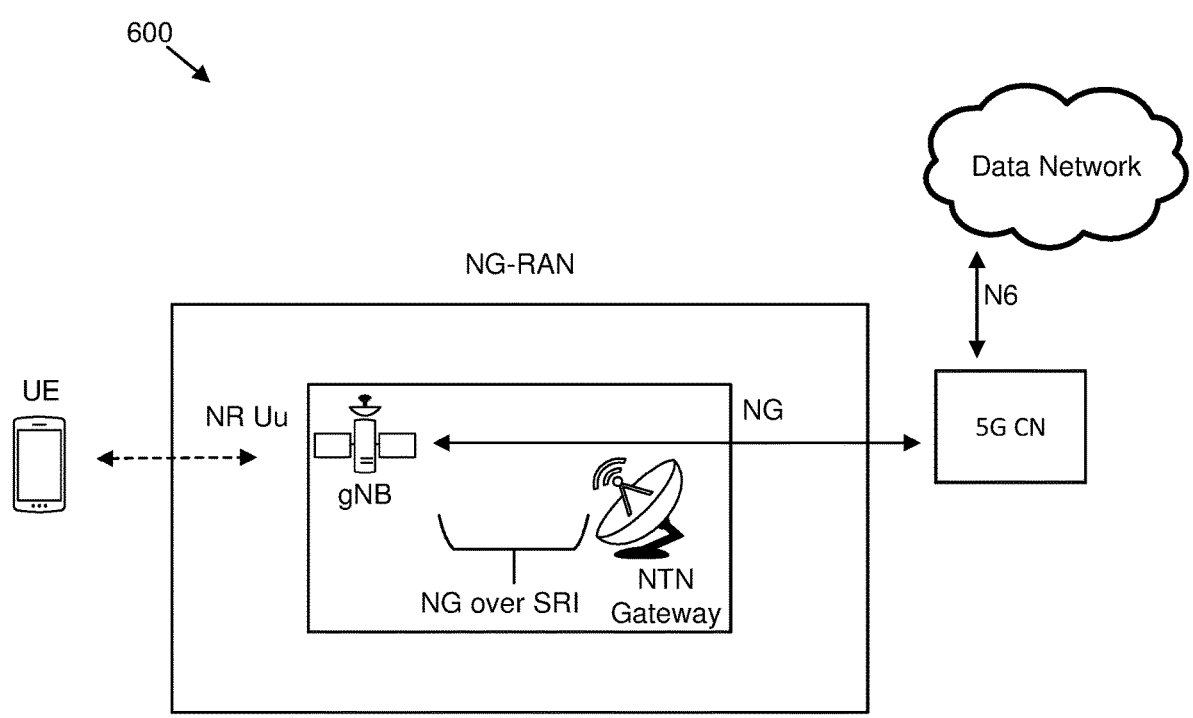
FIG. 6 is a schematic block diagram illustrating one embodiment of an architecture of a non-terrestrial network based on a regenerative payload.
Figure 7:
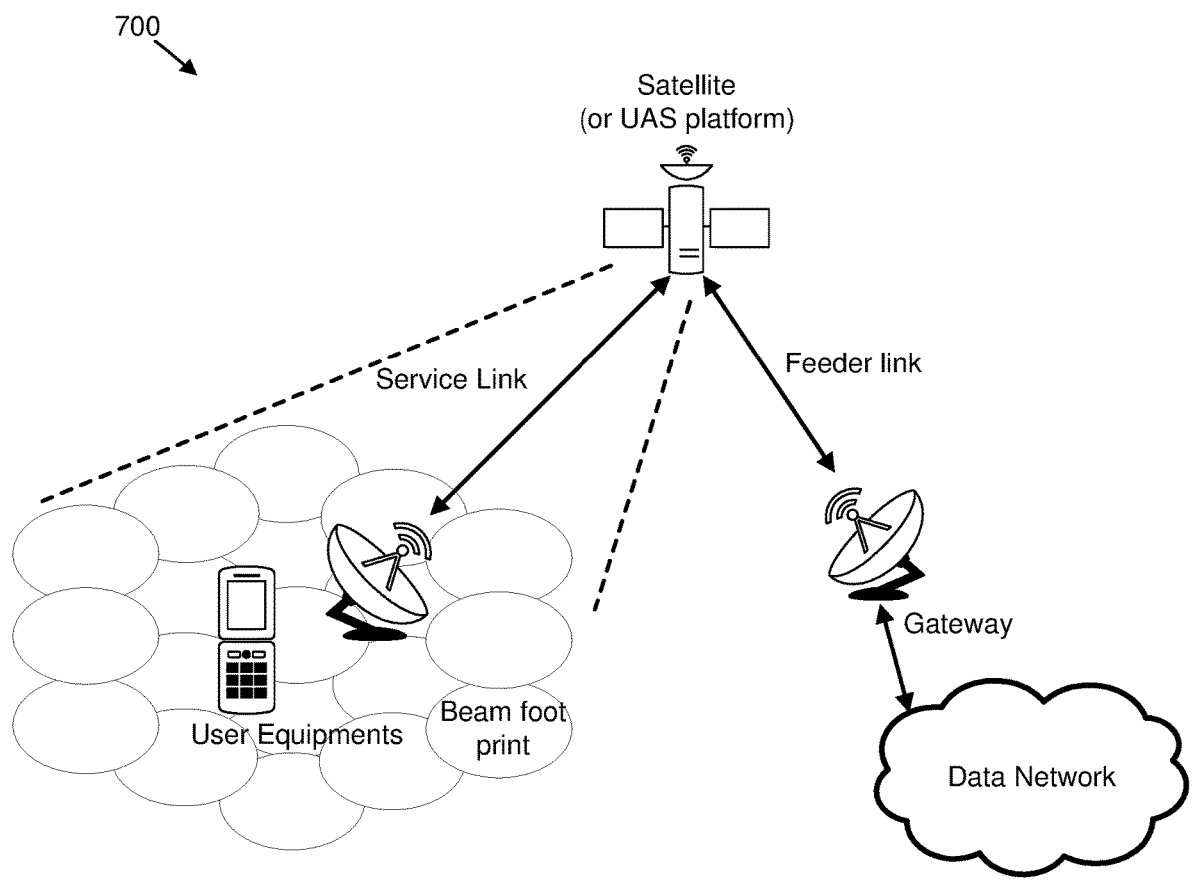
FIG. 7 is a schematic block diagram illustrating one embodiment of a non-terrestrial network based on a transparent payload.
Figure 8:
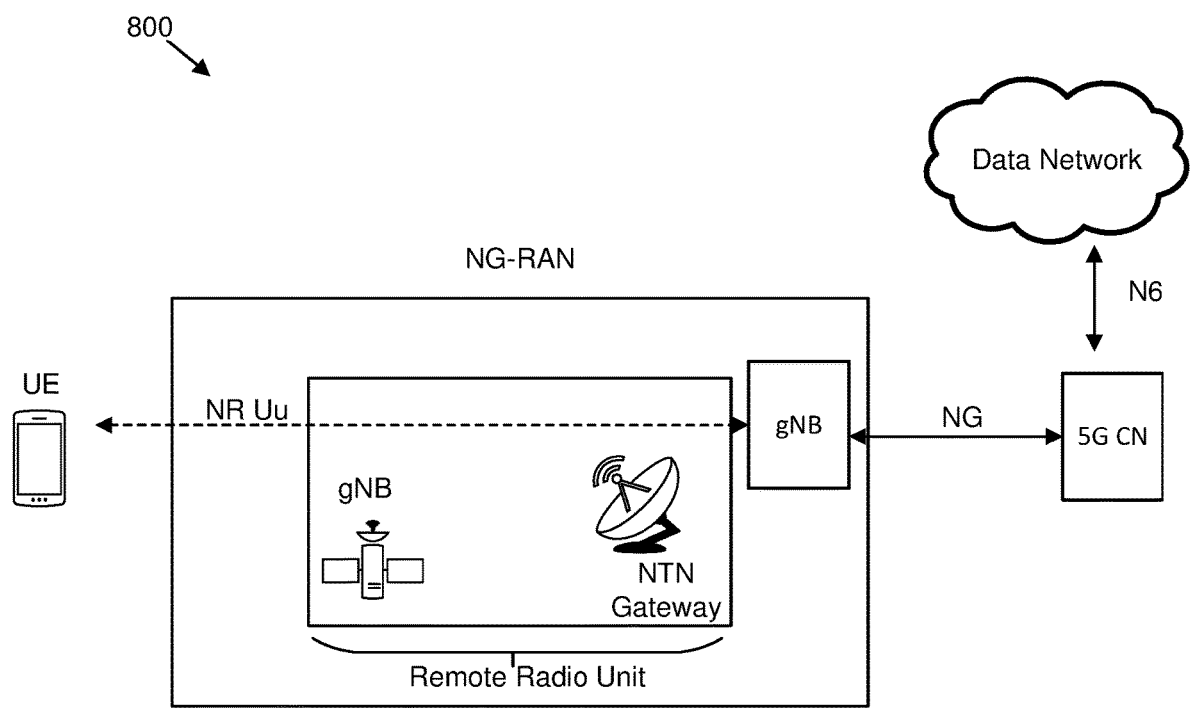
FIG. 8 is a schematic block diagram illustrating one embodiment of an architecture of a non-terrestrial network based on a transparent payload.

FIG. 5 is a schematic block diagram illustrating one embodiment of a non-terrestrial network 500 based on a regenerative payload. Moreover, FIG. 6 is a schematic block diagram illustrating one embodiment of an architecture 600 of a non-terrestrial network based on a regenerative payload. Further, FIG. 7 is a schematic block diagram illustrating one embodiment of a non-terrestrial network 700 based on a transparent payload. FIG. 8 is a schematic block diagram illustrating one embodiment of an architecture 800 of a non-terrestrial network based on a transparent payload.

In some embodiments, a method of UE-triggered CSI measurement and reporting may be used mitigate various problems. This method may be referred to as UE-triggered CSI reporting, aperiodic UE triggered CSI reporting, UE-centric CSI reporting, aperiodic UE-centric CSI reporting, or the like. In such embodiments, a UE may be configured to transmit a CSI report in an aperiodic manner if a triggering condition is satisfied as examined (e.g., assessed or evaluated) by the UE. This is in contrast to configurations in which triggering an aperiodic CSI report is performed by a control signaling from the network. Various embodiments may be beneficial for NTNs such as airborne and spaceborne (e.g., satellite) communication systems where propagation delays may lead to performance degradation if aperiodic CSI reporting requires a direct signaling from the network.

In various embodiments, a new type of CSI reporting may be used where a UE is configured to report CSI in an aperiodic manner, possibly without a trigger signaling from the network.

In certain embodiments, an NT-TRP configures a CSI reporting: 1) the configuration may include information on UE's control of transmitting CSI feedback (e.g., frequency of reporting, resolution, etc.); and/or 2) rules may be in the form of criterion and/or behavior.

In some embodiments, a UE follows a CSI reporting configuration based on criteria such as: 1) changes in channel variations; 2) a UE mobility and/or velocity; and/or 3) a block error rate ("BLER") in downlink reception.

In various embodiments, a UE may report requirements for a modified configuration which may include: 1) capability signaling upon establishing a radio resource control ("RRC") connection; and/or 2) lower layer reporting during the connection.

In certain embodiments, there may be a method for CSI reporting configuration. In such embodiments, a NT-TRP sends a CSI reporting configuration including CSI reporting parameters such as: reportConfigId; carrier (ServCellIndex); resourcesForChannelMeasurement; csi-IM-ResourcesForInterference; nzp-CSI-RS-ResourcesForInterference; reportConfigType: CHOICE {periodic, semiPersistentOnPUCCH, semiPersistentOnPUSCH, aperiodic}; reportQuantity: CHOICE {none, cri-RI-PMI-CQI, cri-RI-i1, cri-RI-i1-CQI, cri-RI-CQI, cri-RSRP, ssb-Index-RSRP, cri-RI-LI-PMI-CQI}; reportFreqConfiguration; timeRestrictionForChannelMeasurements; timeRestrictionForInterferenceMeasurements; codebookConfig; groupBasedBeamReporting; cqi-Table; and/or subbandSize.

In some embodiments, a CSI reporting configuration and related configurations may be produced in a NT-TRP (e.g., for an NTN based on a regenerative payload with a gNB onboard) or produced by a gNB on the ground (e.g., for an NTN based on transparent payload, an NTN with non-collocated centralized unit ("CU") distributed unit ("DU") ("CU-DU") split, a smart repeater onboard, and so forth).

In various embodiments, an NT-TRP transmits the following parameters for a UE-triggered CSI reporting: csi-ReportTriggerCriterionList: SEQUENCE {trigCriterion #1, trigCriterion #2, . . . , trigCriterion #n}. Here, n is the number of triggering criterion parameters for CSI reporting.

In certain embodiments, parameters described in different embodiments herein may be part of a CSI reporting configuration. In some embodiments, parameters described in different embodiments herein may be part of a separate configuration (e.g., a CSI reporting triggering configuration). In various embodiments, a CSI reporting configuration may include an index to a CSI reporting triggering configuration. In certain embodiments, a purpose of triggering criterion parameters may be to trigger an aperiodic CSI reporting by a UE in a UE-centric manner. This UE-centric triggering may be in addition to a reporting behavior determined by a reportConfigType.

In some embodiments, triggering criteria for CSI reporting may include a change in a CSI parameter beyond a threshold. As a UE performs measurements on CSI resources determined by resourcesForChannelMeasurement, csi-IM-ResourcesForInterference, or nzp-CSI-RS-ResourcesForInterference, the UE may observe a change in a CSI parameter such as a hypothetical channel quality indicator ("CQI"), a reference signal receive power ("RSRP"), a signal-to-interference plus noise ratio ("SINR"), a Type II codebook parameter, or the like. The NT-TRP may configure the UE to transmit a CSI report in an aperiodic manner if it detects that the change in the CSI value satisfies a condition. For example, if the difference between a current value of the CSI parameter and a latest value that the UE has reported to the NT-TRP is above a threshold. Other conditions may also include a change below a threshold or a change with respect to one or more thresholds. For this criterion, parameters for a trigCriterion #i (where i is an integer between 1 and n) may be as follows: 1) criterionType: csi-ChangeAboveThreshold; 2) csi-Type: CHOICE {cqi, rsrp, sinr, . . . }; and/or 3) threshold.

In various embodiments, triggering criteria for CSI reporting may include a change in a CSI parameter and/or indicator. In one example, an NT-TRP may configure a UE to transmit a CSI report if a CSI parameter and/or indicator (e.g., such as a preferred CRI) changes from the latest value that the UE has reported to the NT-TRP. In particular, the UE may be configured to examine any change in a CSI parameter and/or indicator or one or more specific changes in a CSI parameter and/or indicator, such as a change in a significant bit of a current and/or new value of the CSI parameter and/or indicator compared to a previous value of the CSI parameter/indicator reported to the network. For this criterion, the parameters for a trig-Criterion #i (where i is an integer between 1 and n) may be as follows: 1) criterionType: csi-Change; and/or 2) csi-Type: CHOICE {cri, ri, il, pmi, . . . }.

In certain embodiments, triggering criteria for CSI reporting may include a rate of change in a CSI parameter and/or indicator. In one example, an NT-TRP may configure a UE to transmit a CSI report if a CSI parameter and/or indicator (e.g., such as a RSRP) changes at a rate beyond a threshold. In this case, a change in the CSI parameter and/or indicator may not necessarily trigger a CSI reporting if the change occurs over a longer period of time, but it may trigger a CSI reporting if the change occurs over a shorter period of time. Parameters such as a change rate, one or more values of change versus one or more time periods, or the like may be determined by configuration parameters and/or by standard specifications. For this criterion, the parameters for a trig-Criterion #i (where i is an integer between 1 and n) may be as follows: 1) criterionType: csi-ChangeRateAboveThreshold; 2) csi-Type: CHOICE {cqi, rsrp, sinr, . . . }; and/or 3) threshold.

In some embodiments, triggering criteria for CSI reporting may include UE movement above a threshold. UEs capable of a global navigation satellite system ("GNSS") service may be common in NTN. The network may take advantage of this UE capability and configure a UE to trigger a CSI reporting if the UE detects that it is moving, particularly if the movement is sudden, if the velocity is above a threshold, and so forth. This criterion may replace or complement other criteria that are based on measurements and calculation of hypothetical CSI parameters. An example of the parameters for a trig-Criterion #i (where i is an integer between 1 and n) may include: 1) criterionType: ue-Movement; 2) movementType: CHOICE {locationChange, orientationChange, velocity, . . . }; and/or 3) threshold.

In various embodiments, triggering criteria for CSI reporting may include a maximum interval between consecutive CSI reports. Since a UE may trigger a CSI reporting in a UE-centric manner that is not in full control of the NT-TRP, the NT-TRP may configure a maximum interval T_max between consecutive CSI reports by the UE. In this case, if no other criterion triggers a CSI reporting, the UE may make certain that the interval between two consecutive CSI reporting (e.g., associated with the CSI reporting configuration and CSI reporting triggering configuration) does not exceed T_max. For this criterion, the parameters for a trig-Criterion #i (where i is an integer between 1 and n) may include: 1) criterionType: maxInterval; and/or 2) threshold (T_max).

Figure 9:
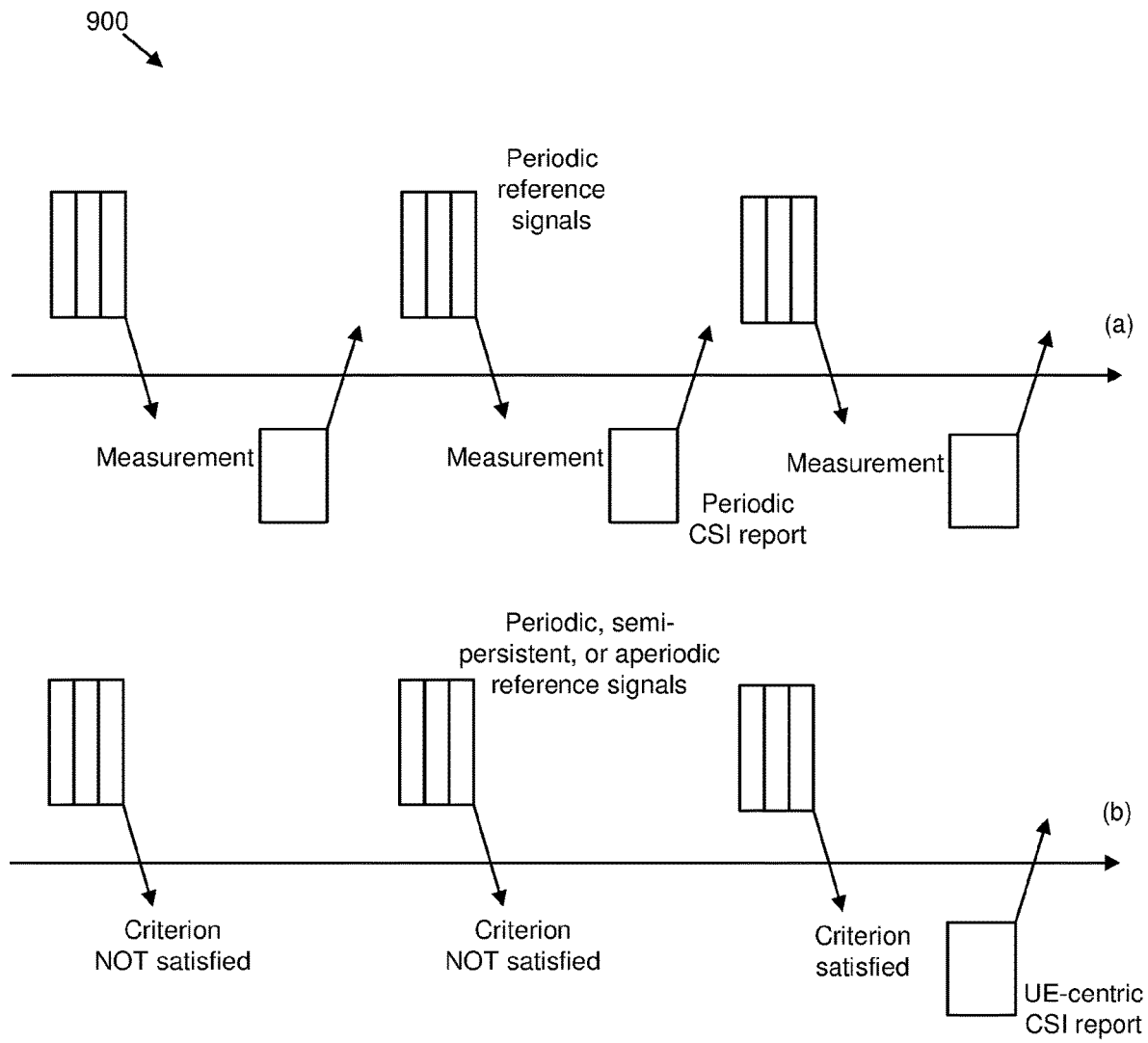
FIG. 9 is a schematic block diagram illustrating one embodiment of timelines for a periodic CSI reporting and a UE-triggered CSI reporting.

FIG. 9 is a schematic block diagram illustrating one embodiment of timelines 900 for a periodic CSI reporting and a UE-triggered CSI reporting. Timeline (a) illustrates a periodic CSI reporting based on UE measurements on periodic reference signals such as periodic CSI reference signal ("RS") ("CSI-RS") or synchronization signal ("SS") and/or physical broadcast channel ("PBCH") ("SS/PBCH") blocks. Timeline (b) illustrates a UE-triggered CSI reporting based on UE measurements on reference signals that may be periodic, semi-persistent, or aperiodic.

Figure 10:
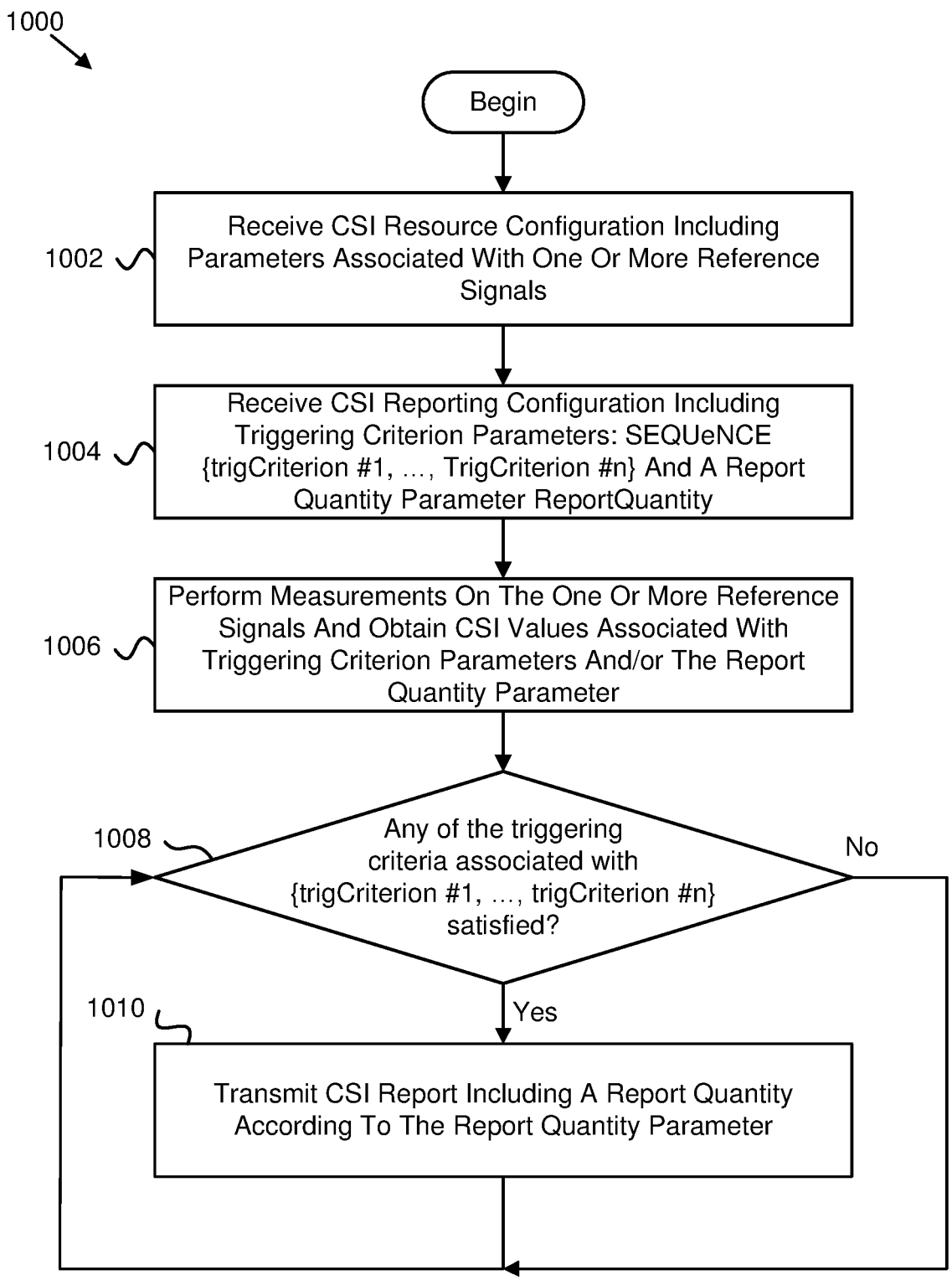
FIG. 10 is a flow chart diagram illustrating one embodiment of a method at a UE.

FIG. 10 is a flow chart diagram illustrating one embodiment of a method 1000 at a UE.

In step 1002, a UE receives a CSI resource configuration. The CSI resource configuration may include parameters (e.g., traditional parameters). In certain embodiments, the CSI resource configuration may include parameters specific to the UE method. Once the UE receives the CSI resource configuration, it may obtain information about resources from which the UE may perform measurements and obtain CSI. The CSI resource configuration may be associated with transmission of CSI-RSs, SS/PBCH blocks, or other reference signals.

In step 1004, the UE receives a CSI reporting configuration. The configuration may include parameters specific to the UE method and/or traditional parameters. In particular, the CSI reporting configuration may include one or more parameters that indicate to the UE that the reporting configuration configures a CSI reporting of a type that may be called UE-centric, UE-triggered, aperiodic UE-centric, aperiodic UE-triggered, or the like. The reporting configuration may also include parameters indicating criteria for triggering a CSI reporting. The criterion parameters may be given as a sequence and/or list such as SEQUENCE {trigCriterion #1, trigCriterion #2, trigCriterion #n}, where n is the number of criterion parameters in the CSI reporting configuration. The parameter n may be variable or constant according to a specification. The CSI reporting may include one or more parameters, such as a parameter reportQuantity, that indicates to the UE which CSI values may be computed and transmitted to the network.

In step 1006, the UE performs measurements on the reference signals configured by the CSI resource configuration to obtain CSI values. The CSI values may be associated with the report quantity parameter reportQuantity in the CSI reporting configuration. For example, if the reportQuantity includes transmitting a CSI-RS resource indicator ("CRI"), a rank indicator ("RI"), a precoding matrix indicator ("PMI"), a channel quality indicator ("CQI"), a reference signal receive power ("RSRP"), and/or a signal-to-interference plus noise ratio ("SINR"), the UE may compute such parameter based on measurements on the reference signals. Furthermore, the UE may compute a CSI value associated with a CSI criterion parameter in the CSI reporting configuration. For example, if the report quantity parameter indicates a PMI and a criterion parameter indicates a change in a CQI or an RSRP above a threshold, the UE may compute a PMI and a CQI or an RSRP in step 1006. In some embodiments, if a criterion parameter indicates to the UE that it needs to obtain other information, for example information of the UE's mobility from a GPS or a GNSS, the UE may obtain the information at this step for examining the associated criterion in step 1008.

In step 1008, the UE examines whether any of the criteria determined by the criterion parameters in the CSI reporting configuration is satisfied. A criterion may indicate that a CSI report may be transmitted if a CSI value changes larger than a threshold, a CSI value and/or indicator changes by any value, the UE has a mobility parameter beyond a threshold, a maximum time interval has passed since the last CSI reporting, or the like. In various embodiments, a UE may examine whether all of the criteria determined by the criterion parameters are satisfied. Whether the UE should examine satisfaction of any or all of the criteria may be determined by a specification, a configuration, a signaling, or the like. If a triggering condition based on the criterion parameters is satisfied, the UE may proceed to step 1010 to transmit a CSI report. Otherwise, the UE may not proceed to step 1010.

In step 1010, upon determining that a triggering condition was satisfied in step 1008, the UE may transmit a CSI report as determined by the CSI reporting configuration. In particular, a report including one or more report quantities as determined by the parameter reportQuantity in the CSI reporting configuration may be reported to the network. In certain embodiments, a CSI reporting configuration includes multiple values of reportQuantity associated with multiple triggering criteria. In such embodiments, the UE may transmit a CSI report including a report quantity associated with the triggering condition that was satisfied.

Table 1 is an example abstract syntax notation ("ASN.1") code for defining a UE-triggered aperiodic CSI reporting based on a CSI reporting configuration.

TABLE 1

```
CSI-ReportConfig ::=                          SEQUENCE {
    reportConfigId                                CSI-ReportConfigId,
    carrier                                       ServCellIndex
OPTIONAL,        -- Need S
    resourcesForChannelMeasurement                CSI-ResourceConfigId,
    csi-IM-ResourcesForInterference               CSI-ResourceConfigId
OPTIONAL,        -- Need R
    nzp-CSI-RS-ResourcesForInterference           CSI-ResourceConfigId
OPTIONAL,        -- Need R
    reportConfigType                              CHOICE {
        periodic                                      SEQUENCE {
            reportSlotConfig                              CSI-
ReportPeriodicityAndOffset,
            pucch-CSI-ResourceList                        SEQUENCE (SIZE
```

TABLE 1-continued

```
(1..maxNrofBWPs)) OF PUCCH-CSI-Resource
        },
        semiPersistentOnPUCCH                SEQUENCE {
                reportSlotConfig             CSI-
ReportPeriodicityAndOffset,
                pucch-CSI-ResourceList       SEQUENCE (SIZE
(1..maxNrofBWPs)) OF PUCCH-CSI-Resource
        },
        semiPersistentOnPUSCH                SEQUENCE {
                reportSlotConfig             ENUMERATED {sl5, sl10,
sl20, sl40, sl80, sl160, sl320},
                reportSlotOffsetList         SEQUENCE (SIZE (1..
maxNrofUL-Allocations)) OF INTEGER(0..32),
                p0alpha                      P0-PUSCH-AlphaSetId
        },
        aperiodic                            SEQUENCE {
                reportSlotOffsetList         SEQUENCE (SIZE
(1..maxNrofUL-Allocations)) OF INTEGER(0..32)
        },
        aperiodicUE-Triggered                SEQUENCE {
                reportSlotOffsetList         SEQUENCE (SIZE
(1..maxNrofUL-Allocations)) OF INTEGER(0..32),
                csi-TriggerCriterionList     SEQUENCE (SIZE
(1..maxNrofTrigCriteria)) OF CSI-TrigCriterion
        },
    },
    [...]
}
CSI-TrigCriterion ::=                        CHOICE {
 -- Criterion defintions
    [...]
}
```

In Table 1, aperiodicUE-Triggered, csi-TriggerCriterionList, maxNrofTrigCriteria, and CSI-TrigCriterion are used. Bracketed ellipsis [ . . . ] may represent additional code.

In Table 1 (e.g., an example definition of the CSI-ReportConfig information element ("IE")), a UE triggered aperiodic CSI reporting is defined which may include parameters similar to those of an aperiodic CSI reporting as well as a list and/or sequence of triggering criterion parameters csi-TriggerCriterionList. This list determines satisfaction of what criteria may trigger a CSI reporting according to the CSI-ReportConfig IE.

In some embodiments, an NT-TRP may transmit a triggering configuration CSI-ReportTriggerConfig as a separate IE and include an index of that configuration in the CSI-ReportConfig that configures a UE-triggered CSI reporting as shown in Table 2.

TABLE 2

```
CSI-ReportConfig ::=                         SEQUENCE {
    reportConfigId                           CSI-ReportConfigId,
    carrier                                  ServCellIndex
OPTIONAL,        -- Need S
    resourcesForChannelMeasurement           CSI-ResourceConfigId,
    csi-IM-ResourcesForInterference          CSI-ResourceConfigId
OPTIONAL,        -- Need R
    nzp-CSI-RS-ResourcesForInterference      CSI-ResourceConfigId
OPTIONAL,        -- Need R
    reportConfigType                         CHOICE {
        periodic                             SEQUENCE {
                reportSlotConfig             CSI-
ReportPeriodicityAndOffset,
                pucch-CSI-ResourceList       SEQUENCE (SIZE
(1..maxNrofBWPs)) OF PUCCH-CSI-Resource
        },
        semiPersistentOnPUCCH                SEQUENCE {
                reportSlotConfig             CSI-
ReportPeriodicityAndOffset,
                pucch-CSI-ResourceList       SEQUENCE (SIZE
(1..maxNrofBWPs)) OF PUCCH-CSI-Resource
        },
        semiPersistentOnPUSCH                SEQUENCE {
                reportSlotConfig             ENUMERATED {sl5, sl10,
sl20, sl40, sl80, sl160, sl320},
                reportSlotOffsetList         SEQUENCE (SIZE (1..
maxNrofUL-Allocations)) OF INTEGER(0..32),
                p0alpha                      P0-PUSCH-AlphaSetId
        },
```

TABLE 2-continued

| | |
|---|---|
| aperiodic | SEQUENCE { |
| reportSlotOffsetList (1..maxNrofUL-Allocations)) OF INTEGER(0..32) | SEQUENCE (SIZE |
| }, | |
| aperiodicUE-Triggered | SEQUENCE { |
| reportSlotOffsetList (1..maxNrofUL-Allocations)) OF INTEGER(0..32), | SEQUENCE (SIZE |
| trigConfigId | CSI-ReportTriggerConfigId |
| }, | |
| }, | |
| [...] | |
| } | |
| CSI-ReportTriggerConfig ::= | SEQUENCE { |
| trigConfigId | CSI-ReportTriggerConfigId, |
| csi-TriggerCriterionList (1..maxNrofTrigCriteria)) OF CSI-TrigCriterion | SEQUENCE (SIZE |
| } | |
| CSI-TrigCriterion ::= | CHOICE { |
| -- Criterion defintions | |
| [...] | |
| } | |

In Table 2, aperiodicUE-Triggered, trigConfigId, CSI-ReportTriggerConfigId, CSI-ReportTriggerConfig, csi-TriggerCriterionList, maxNrofTrigCriteria, and CSI-TrigCriterion are used. Bracketed ellipsis [ . . . ] may represent additional code.

In various embodiments, a UE-triggered aperiodic CSI reporting may be defined similar to an aperiodic CSI reporting. However, the NT-TRP may send an additional triggering configuration that points to the aperiodic configuration (e.g., by its configuration ID) as shown in Table 3.

TABLE 3

| | |
|---|---|
| CSI-ReportConfig ::= | SEQUENCE { |
| reportConfigId | CSI-ReportConfigId, |
| carrier OPTIONAL, -- Need S | ServCellIndex |
| resourcesForChannelMeasurement | CSI-ResourceConfigId, |
| csi-IM-ResourcesForInterference OPTIONAL, -- Need R | CSI-ResourceConfigId |
| nzp-CSI-RS-ResourcesForInterference OPTIONAL, -- Need R | CSI-ResourceConfigId |
| reportConfigType | CHOICE { |
| periodic | SEQUENCE { |
| reportSlotConfig | CSI-ReportPeriodicityAndOffset, |
| pucch-CSI-ResourceList (1..maxNrofBWPs)) OF PUCCH-CSI-Resource | SEQUENCE (SIZE |
| }, | |
| semiPersistentOnPUCCH | SEQUENCE { |
| reportSlotConfig | CSI-ReportPeriodicityAndOffset, |
| pucch-CSI-ResourceList (1..maxNrofBWPs)) OF PUCCH-CSI-Resource | SEQUENCE (SIZE |
| }, | |
| semiPersistentOnPUSCH | SEQUENCE { |
| reportSlotConfig sl20, sl40, sl80, sl160, sl320}, | ENUMERATED {sl5, sl10, |
| reportSlotOffsetList maxNrofUL-Allocations)) OF INTEGER(0..32), | SEQUENCE (SIZE (1.. |
| p0alpha | P0-PUSCH-AlphaSetId |
| }, | |
| aperiodic | SEQUENCE { |
| reportSlotOffsetList (1..maxNrofUL-Allocations)) OF INTEGER(0..32) | SEQUENCE (SIZE |
| }, | |
| }, | |
| [...] | |
| } | |
| CSI-ReportTriggerConfig ::= | SEQUENCE { |
| csi-TriggerCriterionList (1..maxNrofTrigCriteria)) OF CSI-TrigCriterion | SEQUENCE (SIZE |
| reportConfigId | CSI-ReportConfigId, |
| } | |
| CSI-TrigCriterion ::= | CHOICE { |
| -- Criterion defintions | |
| [...] | |
| } | |

In Table 3, CSI-ReportTriggerConfig, csi-TriggerCriterionList, maxNrofTrigCriteria, and CSI-TrigCriterion are used. Bracketed ellipsis [ . . . ] may include additional code.

In certain embodiments, a UE receives a configuration and may perform measurements and transmit a CSI report if either a control signaling such as a DCI message triggers a CSI reporting or if a triggering condition is satisfied as determined by the configuration.

In some embodiments, a UE uses resources determined by CSI resource configurations for examining whether a triggering condition is satisfied. For example, if a UE is configured to perform measurements and transmit a CRI, an RI, a PMI, or a CQI if an RSRP has changed above a threshold, the UE may perform measurements for obtaining the RSRP on the same reference signals that are used to obtain the CRI, RI, PMI, or CQI. However, various embodiments, any of the methods found here may be used. Moreover, measurements for examining triggering criteria may be performed on different resources (e.g., different reference signals) as seen in Table 4.

TABLE 4

| | |
|---|---|
| CSI-ReportTriggerConfig ::= | SEQUENCE { |
| csi-TriggerCriterionList | SEQUENCE (SIZE |
| (1..maxNrofTrigCriteria)) OF CSI-TrigCriterion | |
| reportConfigId | CSI-ReportConfigId, |
| carrier | ServCellIndex |
| OPTIONAL, | -- Need S |
| resourcesForChannelMeasurement | CSI-ResourceConfigId |
| OPTIONAL, | -- Need S |
| csi-IM-ResourcesForInterference | CSI-ResourceConfigId |
| OPTIONAL, | -- Need R |
| nzp-CSI-RS-ResourcesForInterference | CSI-ResourceConfigId |
| OPTIONAL | -- Need R |
| } | |
| CSI-TrigCriterion ::= | CHOICE { |
| -- Criterion defintions | |
| [...] | |
| } | |

Table 5 is one example of where CSI resources for each criterion may be different.

TABLE 5

| | |
|---|---|
| CSI-ReportTriggerConfig ::= | SEQUENCE { |
| csi-TriggerCriterionList | SEQUENCE ( SIZE |
| (1..maxNrofTrigCriteria)) OF CSI-TrigCriterion | |
| reportConfigId | CSI-ReportConfigId, |
| } | |
| CSI-TrigCriterion ::= | CHOICE { |
| -- Criterion defintions | |
| [...] | |
| carrier | ServCellIndex |
| OPTIONAL, | -- Need S |
| resourcesForChannelMeasurement | CSI-ResourceConfigId |
| OPTIONAL, | -- Need S |
| csi-IM-ResourcesForInterference | CSI-ResourceConfigId |
| OPTIONAL, | -- Need R |
| nzp-CSI-RS-ResourcesForInterference | CSI-ResourceConfigId |
| OPTIONAL | -- Need R |
| } | |

In Table 5, CSI-ReportTriggerConfig, csi-TriggerCriterionList, maxNrofTrigCriteria, and CSI-TrigCriterion are used. Bracketed ellipsis [ . . . ] may represent additional code.

In various embodiments, some triggering criteria may not need separate CSI resources. For example, if a triggering criterion depends on a global positioning system ("GPS") and/or GNSS measurement, a CSI resource may not be configured, or the UE may otherwise neglect the CSI resource for this type of triggering criterion. If a UE does need a CSI resource for trigger-related measurements, but no CSI resource is explicitly configured for the measurements, the UE may use CSI resources configured for the associated reporting as the default CSI resource for performing measurements. In certain embodiments, a configuration or a specification may designate resources or reference signals such as CSI-RS or SS/PBCH blocks for performing trigger-related measurements.

In some embodiments, a UE may perform measurements based on criteria indicated by a configuration (and/or a specification) to determine whether to transmit a CSI report to the network. A criterion for triggering a CSI reporting may be a change in a CSI parameter and/or indicator, a change of a CSI parameter beyond a threshold, and/or a change in a CSI parameter with a rate that is beyond a threshold.

In various embodiments, to determine whether a criterion is satisfied, a UE may perform measurements on reference signals as determined by a configuration (e.g., a CSI reporting configuration or a triggering configuration) and may compute one or more CSI parameters. Rules may be defined by a standard and/or by configurations to determine if a UE may or should perform measurements, how to compute the one or more CSI parameters, and so forth.

In certain embodiments, depending on a type of the CSI resources configured for trigger-related measurements, a UE may perform trigger-related measurements at different times and periodicities. For example, the UE may perform measurements on all the CSI resources (e.g., perform periodic measurements on periodic reference signals, perform measurements on semi-persistent reference signals when they are activated, and/or perform measurements on aperiodic reference signals when they are triggered by a signaling). In some embodiments, trigger-related measurements by the UE may be less frequent (e.g., the UE may perform measurements on the CSI resources by a periodicity that is different from a periodicity of the CSI resources, for example by skipping measurements on some reference signal occurrences, skipping measurements when the UE is inactive or idle or while it is performing another conflicting operation, and so forth).

In various embodiments, details on how a CSI report is produced may be determined by a specification and/or a configuration. For example, an ordering for computing CSI quantities may be determined such as follows: 1) a beam index quantity such as a CRI or an SS/PBCH block resource indicator ("SSBRI"); 2) a RI or another indicator of a multiple input multiple output ("MIMO") channel associated with the beam index quantity; 3) a PMI, an element of a precoding matrix ("ii"), a layer indicator ("LI"), or another indicator of a MIMO channel associated with any or all of the above quantities; and/or 4) a CQI, a RSRP, a SINR, a Doppler indicator ("DI"), or another CSI quantity associated with any or all the above quantities. Other CSI quantities or other ordering of computing CSI quantities are not precluded.

In certain embodiments, not only an ordering of CSI quantities may be applied to computing the content of a CSI report, such as the quantities associated with a parameter reportQuantity, but also an ordering may be specified by a specification or a configuration, for computing trigger-related quantities.

In some embodiments, if a CSI quantity Q1 is computed for examining a triggering criterion and a CSI quantity Q2 is computed as a report quantity, a value of Q2 may be computed based on a value of Q1 either directly or indirectly. The value of Q1 based on which the value of Q2 is computed may be taken from: 1) a current measurement; 2) a previous CSI report, such as: a) a report quantity of the latest CSI report associated with a same CSI reporting configuration, b) a report quantity of the latest CSI report that may not necessarily be associated with a same CSI reporting configuration, c) a CSI report not sent earlier than a threshold with respect to a time of transmitting a current CSI report, where the CSI report may be associated with a same CSI reporting configuration, and/or d) a CSI report not sent earlier than a threshold with respect to a time of transmitting a current CSI report, where the CSI report may not necessarily be associated with a same CSI reporting configuration; or 3) the like.

For example, if a UE is configured to transmit a CSI report including a PMI value upon a change of an RI value, the UE may: 1) compute an RI value RI1; 2) determine that the RI value RI1 is different from a previously reported RI value RI0; and/or 3) transmit a CSI report including a PMI value PMI1 computed based on the currently computed RI value RI1.

In various embodiments, if a CSI quantity Q1 is computed for examining a triggering criterion and a CSI quantity Q2 is computed as a report quantity, a value of Q1 may be computed based on a value of Q2 either directly or indirectly. The value of Q2 based on which the value of Q1 is computed may be taken from: 1) a current measurement; 2) a previous CSI report, such as: a) a report quantity of the latest CSI report associated with a same CSI reporting configuration, b) a report quantity of the latest CSI report that may not necessarily be associated with a same CSI reporting configuration, c) a CSI report not sent earlier than a threshold with respect to a time of transmitting a current CSI report, where the CSI report may be associated with a same CSI reporting configuration, d) a CSI report not sent earlier than a threshold with respect to a time of transmitting a current CSI report, where the CSI report may not necessarily be associated with a same CSI reporting configuration; or 3) the like.

In certain embodiments, if a configuration indicates a CSI quantity as both a report quantity and a triggering criterion, a same or a different value of the CSI quantity may be computed as the report quantity and for examining the triggering criterion. This may be determined by a specification or a configuration. For example, if a value of CQI is to be evaluated for examining a triggering criterion and reporting to the network, a CQI value may be computed first based on values of CRI, RI, and/or PMI that were previously reported by the UE to the network. However, if the UE examines the triggering conditions and determines that it should transmit a CSI report, it may compute new values of CRI, RI, and/or PMI and, consequently, compute a different value of CQI for CSI reporting.

In some embodiments, a value of Q1 may not depend on a value of Q2, or vice versa. For example, if a UE is configured to a transmit a CSI report including a PMI value upon a change of a CQI value beyond a threshold T, the UE may: 1) compute a CQI value CQI1; 2) determine that a difference between the CQI value CQI1 and a previously reported CQI value CQI0 is beyond the threshold T; and/or 3) transmit a CSI report comprising a PMI value PMI1. As may be appreciated, other inter-dependency relationships between CSI reporting quantities and triggering criterion quantities are not precluded.

In various embodiments, methods and embodiments are described with an emphasis on Type I codebook terminology such as RI and PMI. This may be for the sake of brevity and simplicity of examples and may not intend to limit the scope of the present disclosure to Type I CSI reporting only. Similar principles may be applicable to other types of CSI reporting such as Type II codebooks. In Type II codebooks, an ordering of computing CSI values may be different in principle. In one example, upon computing beam indices such as a CRI, a precoding matrix is computed, which determines jointly a MIMO channel rank and a precoding matrix (e.g., abstracted by RI, LI, PMI in Type I codebooks in principle). Then, a CQI may be computed based on the determined CRI and/or the precoding matrix. In another example, a precoding matrix is computed, which determines jointly a MIMO channel rank and a precoding matrix (e.g., abstracted by RI, LI, PMI in Type I codebooks in principle). Then, a CQI may be computed based on the Type II precoding matrix.

In certain embodiments, reporting Type II codebooks or other types of CSI quantities may include fragmenting or grouping different pieces of CSI. In such embodiments, the inter-dependency relationships may be extended to embodiments in which a part of a CSI quantity may depend on a trigger-related quantity or vice versa, or a part of CSI quantity may be used for examining a triggering criterion.

In some embodiments, a first part of a CSI quantity may be reported upon satisfaction of a first triggering condition, while a second part of the CSI quantity may be reported upon satisfaction of a second triggering criterion. The first part may overlap with the second part and the first part may be a subset or a superset of the second part. Examining the first triggering criterion may depend on a value in the second part of the CSI quantity, or vice versa. A value of the first part or the second part of the CSI quantity may be taken from a current measurement or from a latest CSI report that the UE has transmitted to the network.

Various embodiments described herein may be described with an emphasis on a UE behavior. The UE may receive configurations, receive control signaling, receive reference signals, perform measurements, examine whether a triggering condition is satisfied, and transmit a CSI report if the condition is satisfied. In certain embodiments, a role of network entities, such as a NT-TRP or a gNodeB ("gNB") may be identified.

In some embodiments, for an NTN architecture based on a regenerative payload, a gNB may be deployed onboard a non-terrestrial vehicle such as a satellite, an airplane, a balloon, or the like. In various embodiments, a DU of a gNB may be onboard a vehicle while a CU is deployed on the ground, for example at a gateway ("GW").

In certain embodiments, for an NTN architecture based on transparent payload, all or most of the gNB functionalities may be implemented on a terrestrial network entity such as gNB or a GW. It should be noted that other cases, such as relays including smart relays, where the NT-TRP includes a realization of a control plane ("CP") onboard, but not a user plane ("UP"), are not precluded.

In some embodiments, an NT-TRP may send configurations to one or more UEs in a UE-specific manner, a UE-group-specific manner, or broadcast for all receiving UEs in an area. The network may employ one or more NT-TRPs for connection to a UE. If more than one NT-TRP is connected to a UE, a signaling received from an NT-TRP, such as a configuration, a control signal, or a reference signal, may not necessarily correspond with operations with that NT-TRP. For example, a UE may perform measurements on reference signals from an NT-TRP, but it may transmit an associated CSI report to another NT-TRP. Details may be determined by configurations and/or specifications.

In various embodiments described herein, if a UE receives a configuration or a control message, it may receive it from an NT-TRP. For a regenerative payload, the NT-TRP, such as a gNB onboard a satellite, may have generated the message. For a transparent payload, the NT-TRP may relay messages from a gNB on the ground via a GW. Similarly, a UE may transmit a CSI report or other signaling to a NT-TRP.

In certain embodiments, a UE may be connected to an NT-TRP and a ground network entity. In such embodiments, any of the transmission or reception operations found herein may be to or from a terrestrial and/or ground entity such as a gNB or a non-terrestrial entity such as an NT-TRP. For example, a UE may perform CSI measurements on reference signals from a NT-TRP, but the UE may transmit a CSI report to a gNB on the ground. In this case, configurations from the network may be received from the terrestrial network entity and/or the non-terrestrial network entity.

In some embodiments, although embodiments described herein may be described with an emphasis on application in NTN, the scope is not limited to NTN. The embodiments may be implemented in other types of systems in which a UE-centric approach to triggering CSI reports is deemed beneficial.

In various embodiments, such as in NR systems, a UE may use types of uplink channels for transmitting a CSI report as shown in Table 6.

TABLE 6

| CSI report type | Uplink channel |
|---|---|
| Periodic | PUCCH |
| Semi-persistent | PUCCH, PUSCH |
| Aperiodic | PUSCH |

In certain embodiments, rules found herein may facilitate avoiding wasting resources by allocating resources to a CSI report only if they are needed. Since periodic reports are to be transmitted by the UE periodically as long as the CSI reporting configuration is valid, physical uplink control channel ("PUCCH") resources may be configured for the CSI report in a periodic manner. For an aperiodic CSI report, however, allocation of periodic PUCCH resources may be wasted if the UE does not transmit a CSI report. Therefore, an aperiodic CSI report may be triggered by a DCI format 0_1 (e.g., scheduling grant); hence, signaling to the UE to use the granted PUSCH resources for transmitting an aperiodic CSI report. Semi-persistent CSI reports may have a behavior that falls between periodic and aperiodic and therefor may be configured to be transmitted on either a PUCCH or a physical uplink shared channel ("PUCCH").

In some embodiments, UE-triggered CSI reporting methods described herein may not follow a similar principle to other embodiments. On the one hand, the CSI reporting is not periodic, hence, a periodic resource allocation may result in a large resource waste, particularly if the frequency of transmitting the CSI reports is much smaller than the periodicity of the resources allocated for it. On the other hand, the network may not be immediately informed of a need for CSI reporting resources due to a long propagation delay.

In various embodiments, a network configures a pool of PUCCH resources for UE-triggered CSI reporting. The configuration of the PUCCH pool may be associated with CSI reporting by including a PUCCH resource pool identifier ("ID") in the configuration of the CSI reporting.

In certain embodiments, a PUCCH resource pool may be configured in different ways. One way to create a PUCCH resource pool is to create a configuration comprising a number of PUCCH resource IDs. Then, the resources configured by each of the associated PUCCH resources belong to the PUCCH resource pool. Another way to create a PUCCH resource pool is to create a PUCCH resource configuration where at least one parameter such as the physical resource blocks ("PRBs"), symbols, a cyclic shift parameter, or the like may take multiple values rather than one value.

In some embodiments, one way to create a PUCCH resource pool is to create a configuration including a number of PUCCH resource IDs. More specifically, a PUCCH resource pool may be created in a same way a PUCCH resource set IE is created, as shown in Table 7.

TABLE 7

```
-- A set with one or more PUCCH resources
PUCCH-ResourceSet ::=    SEQUENCE {
    pucch-ResourceSetId         PUCCH-ResourceSetId,
    resourceList                SEQUENCE (SIZE (1..maxNrofPUCCH-
ResourcesPerSet)) OF PUCCH-ResourceId,
    maxPayloadSize              INTEGER (4..256)
OPTIONAL   -- Need R
}
```

In various embodiments, instead of allocating a PUCCH resource to a CSI report configuration, a PUCCH resource ID may be included as shown in Table 8.

TABLE 8

```
CSI-ReportConfig ::=                          SEQUENCE {
    reportConfigId                                CSI-ReportConfigId,
    carrier                                       ServCellIndex
OPTIONAL,        -- Need S
    resourcesForChannelMeasurement                CSI-ResourceConfigId,
    csi-IM-ResourcesForInterference               CSI-ResourceConfigId
OPTIONAL,        -- Need R
    nzp-CSI-RS-ResourcesForInterference           CSI-ResourceConfigId
OPTIONAL,        -- Need R
    reportConfigType                              CHOICE {
        periodic                                      SEQUENCE {
            reportSlotConfig                              CSI-
ReportPeriodicityAndOffset,
            pucch-CSI-ResourceList                        SEQUENCE (SIZE
(1..maxNrofBWPs)) OF PUCCH-CSI-Resource
    },
```

TABLE 8-continued

```
    semiPersistentOnPUCCH                SEQUENCE {
         reportSlotConfig                    CSI-
ReportPeriodicityAndOffset,
         pucch-CSI-ResourceList              SEQUENCE (SIZE
(1..maxNrofBWPs)) OF PUCCH-CSI-Resource
    },
    semiPersistentOnPUSCH                SEQUENCE {
         reportSlotConfig                    ENUMERATED {sl5, sl10,
sl20, sl40, sl80, sl160, sl320},
         reportSlotOffsetList                SEQUENCE (SIZE (1..
maxNrofUL-Allocations)) OF INTEGER(0..32),
         p0alpha                             P0-PUSCH-AlphaSetId
    },
    aperiodic                            SEQUENCE {
         reportSlotOffsetList                SEQUENCE (SIZE
(1..maxNrofUL-Allocations)) OF INTEGER(0..32)
    }
    },
    [...]
}
[...]
PUCCH-CSI-Resource ::=                   SEQUENCE {
    uplinkBandwidthPartId                BWP-Id,
    pucch-Resource                       PUCCH-ResourceId
}
```

In certain embodiments, a new configuration allowing a PUCCH resource pool and/or set may be defined as shown in Table 9.

TABLE 9

```
CSI-ReportConfig ::=                     SEQUENCE {
    reportConfigId                       CSI-ReportConfigId,
    carrier                              ServCellIndex
OPTIONAL,      -- Need S
    resourcesForChannelMeasurement       CSI-ResourceConfigId,
    csi-IM-ResourcesForInterference      CSI-ResourceConfigId
OPTIONAL,      -- Need R
    nzp-CSI-RS-ResourcesForInterference  CSI-ResourceConfigId
OPTIONAL,      -- Need R
    reportConfigType                     CHOICE {
       periodic                          SEQUENCE {
         reportSlotConfig                    CSI-
ReportPeriodicityAndOffset,
         pucch-CSI-ResourceList              SEQUENCE (SIZE
(1.. maxNrofBWPs)) OF PUCCH-CSI-Resource
    },
    semiPersistentOnPUCCH                SEQUENCE {
         reportSlotConfig                    CSI-
ReportPeriodicityAndOffset,
         pucch-CSI-ResourceList              SEQUENCE (SIZE
(1..maxNrofBWPs)) OF PUCCH-CSI-Resource
    },
    semiPersistentOnPUSCH                SEQUENCE {
         reportSlotConfig                    ENUMERATED {sl5, sl10,
sl20, sl40, sl80, sl160, sl320},
         reportSlotOffsetList                SEQUENCE (SIZE (1..
maxNrofUL-Allocations)) OF INTEGER(0..32),
         p0alpha                             P0-PUSCH-AlphaSetId
    },
    aperiodic                            SEQUENCE {
         reportSlotOffsetList                SEQUENCE (SIZE
(1..maxNrofUL-Allocations)) OF INTEGER (0..32)
    },
    aperiodicUE-Triggered                SEQUENCE {
         reportSlotConfig                    CSI-
ReportPeriodicityAndOffset,
         pucch-CSI-ResourceSetList           SEQUENCE (SIZE
(1..maxNrofBWPs)) OF PUCCH-CSI-ResourceSet
    },
    },
    [...]
}
```

TABLE 9-continued

```
[...]
PUCCH-CSI-Resource ::=          SEQUENCE {
    uplinkBandwidthPartId           BWP-Id,
    pucch-Resource                  PUCCH-ResourceId
}
PUCCH-CSI-ResourceSet ::=       SEQUENCE {
    uplinkBandwidthPartId           BWP-Id,
    pucch-ResourceSet               PUCCH-ResourceSetId
}
```

In Table 9, pucch-CSI-ResourceSetList is of type PUCCH-CSI-ResourceSet for each bandwidth part and is used as a PUCCH resource pool for a aperiodicUE-Triggered type. Bracketed ellipsis [ . . . ] may represent additional code.

In some embodiments, a PUCCH resource set may be referred to as a PUCCH resource pool.

In various embodiments, a PUCCH resource pool may be created by creating a PUCCH resource configuration where at least one parameter such as the PRBs, symbols, a cyclic shift parameter, or the like may take multiple values rather than one value.

In certain embodiments, a PUCCH resource IE is defined as shown in Table 10.

TABLE 10

```
PUCCH-Resource ::=              SEQUENCE {
    pucch-ResourceId                PUCCH-ResourceId,
    startingPRB                     PRB-Id,
    intraSlotFrequencyHopping       ENUMERATED { enabled }
    OPTIONAL, -- Need R
    secondHopPRB                    PRB-Id
    OPTIONAL, -- Need R
    format                          CHOICE {
        format0                         PUCCH-format0,
        format1                         PUCCH-format1,
        format2                         PUCCH-format2,
        format3                         PUCCH-format3,
        format4                         PUCCH-format4
    }
}
```

In some embodiments, a PUCCH resource pool may be created as shown in Table 11.

TABLE 11

```
PUCCH-ResourcePool ::=          SEQUENCE {
    pucch-ResourceId                PUCCH-ResourceId,
    startingPRB-Set                 SEQUENCE (SIZE (1..maxPUCCH-
ResourcePoolSize)) OF PRB-Id,
    intraSlotFrequencyHopping       ENUMERATED { enabled }
    OPTIONAL, -- Need R
    secondHopPRB                    PRB-Id
    OPTIONAL, -- Need R
    format                          CHOICE {
        format0                         PUCCH-format0,
        format1                         PUCCH-format1,
        format2                         PUCCH-format2,
        format3                         PUCCH-format3,
        format4                         PUCCH-format4
    }
}
maxPUCCH-ResourcePoolSize       INTEGER ::= 16
```

In Table 11, PUCCH-ResourcePool, startingPRB-Set, and maxPUCCH-ResourcePoolSize are used. Bracketed ellipsis [ . . . ] may represent additional code. As may be appreciated, a similar method may be applied to symbols or other parameters in a format parameter.

In various embodiments, once a PUCCH resource pool is allocated for a UE-triggered CSI report configuration for a UE, the UE may randomly select a resource (e.g., associated with a PUCCH resource ID) from the PUCCH resource pool and use the resource for transmitting a UE-triggered CSI report as indicated in a configuration.

In certain embodiments, once a UE is configured with a UE-triggered CSI reporting and an associated PUCCH resource pool, it performs measurements on the CSI resources for any of the CSI criteria. If a CSI criterion is satisfied, it creates a CSI report according to the configuration and selects a PUCCH resource from the associated PUCCH resource pool randomly. Then, it uses the selected PUCCH resource to transmit the CSI report.

In some embodiments, there is a nonzero probability that multiple UEs select a same PUCCH resource simultaneously for transmitting CSI reports. This may result in a collision between the CSI reports, hence making all those CSI reports undecodable for the receiver. In this case, the NT-TRP and/or gNB may ignore the CSI reports and continue communications as if no CSI reports were received.

In various embodiments, since PUCCH resources are shared among multiple UEs, the NT-TRP and/or gNB may have a way to identify a transmitter. For this purpose, a new parameter may be defined in the CSI report that contains an ID of the UE. The bit-width of the identifier does not need to be larger than $\log 2(N)$, where N is the number of UEs that may use a PUCCH resource from the PUCCH resource pool. A unique UE ID may be assigned to each UE at the time that the PUCCH resource pool is associated with a CSI report (e.g., as a parameter in the CSI reporting configuration).

Figure 11:
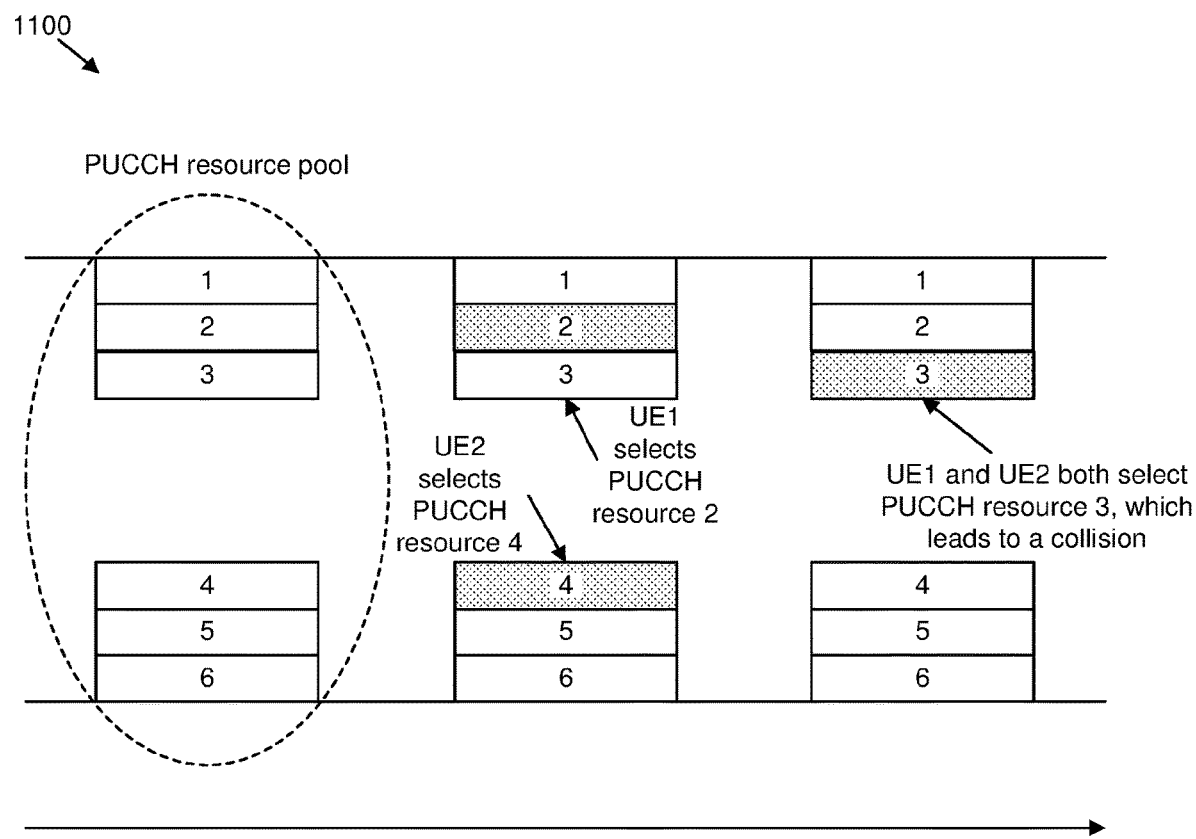
FIG. 11 is a schematic block diagram illustrating one embodiment of a PUCCH resource pool for UE-triggered CSI reporting.

An example of PUCCH resource pool for UE-triggered CSI reporting is illustrated in FIG. 11. FIG. 11 is a schematic block diagram illustrating one embodiment of a PUCCH resource pool 1100 for UE-triggered CSI reporting. A PUCCH resource pool including 6 PUCCH resources is configured for UE1 and UE2. As long as UE1 and UE2 select different PUCCH resources in the pool, the CSI reports can be received successfully by the NT-TRP and/or gNB. However, if the two UEs select the same PUCCH resource for a CSI reporting, a collision may occur and neither of the CSI reports may be decodable.

In certain embodiments, if a PUCCH resource pool of one PUCCH resource is configured for one UE, the network may allocate a PUCCH resource to the UE in a periodic manner so that the UE can use the resource for CSI reporting at any occurrence of the PUCCH resource without a risk of collision. Therefore, a periodic PUCCH resource may be allocated to the UE for UE-triggered CSI reporting.

In some embodiments there may be diversity random access schemes. In such embodiments, diversity random access schemes may be used in satellite communications to alleviate the effect of collisions between random access signals from multiple ground terminals. A similar scheme may be employed by UEs for the UE-triggered CSI reporting scheme using a PUCCH resource pool. In such embodiments, a UE transmits multiple replicas of the CSI report, each on a different PUCCH resource. If the NT-TRP and/or gNB may successfully decode one replica of a CSI report, it may reconstruct another replica and use the signal to perform interference cancelation and decode CSI reports from one or more other UEs.

Figure 12:
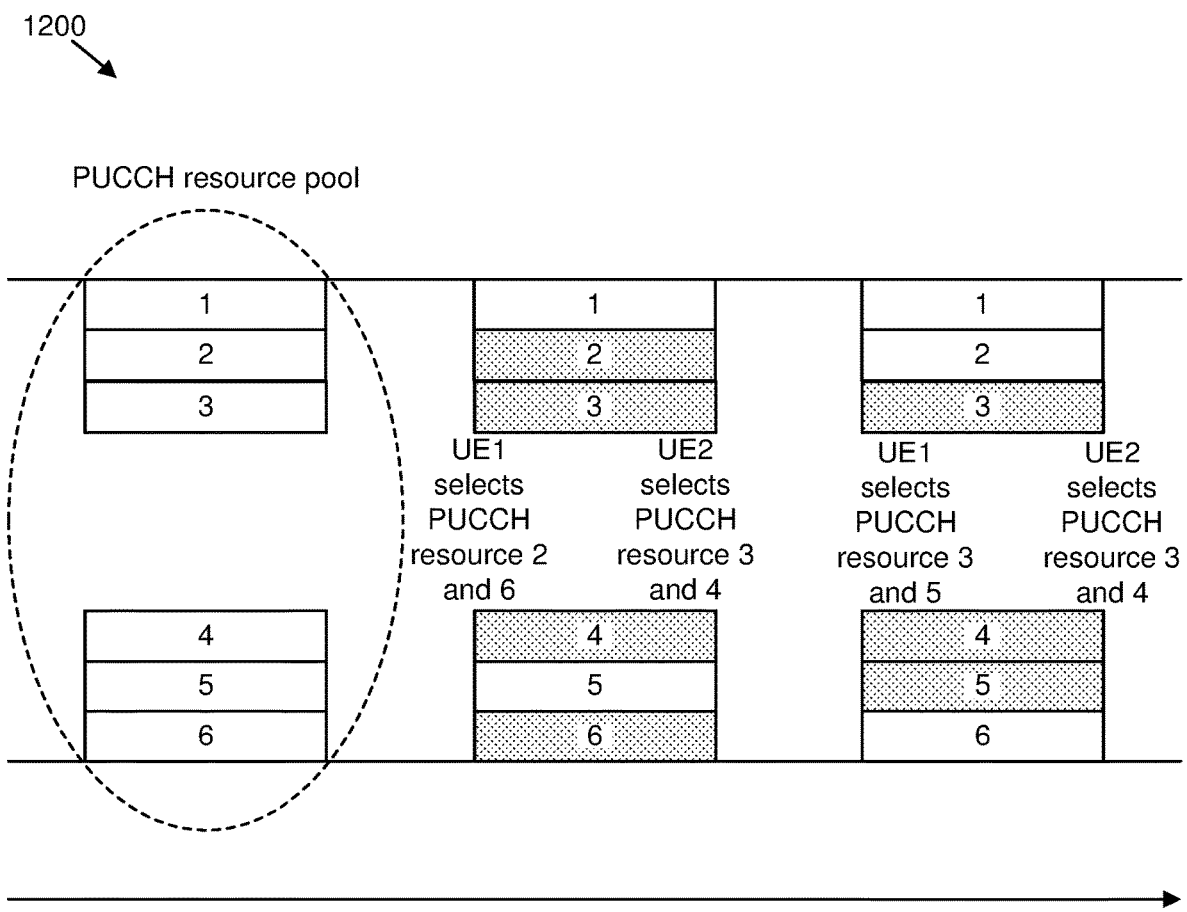
FIG. 12 is a schematic block diagram illustrating one embodiment of a diversity scheme for UE-triggered CSI reporting.

An example of employing a diversity scheme for UE-triggered CSI reporting is illustrated in FIG. 12. FIG. 12 is a schematic block diagram illustrating one embodiment of a diversity scheme 1200 for UE-triggered CSI reporting. In this example, UE1 selects PUCCH resources 3 and 5 for CSI reporting, while UE2 happens to select PUCCH resource 3 and 4. Therefore, although a collision occurs in PUCCH resource 3, intact replicas of the CSI reports from UE1 and UE2 on PUCCH resources 5 and 4, respectively, allows the NT-TRP and/or gNB to decode the CSI report successfully. Furthermore, for example, if the extra replica of UE2's report on resource 4 may also happen to be corrupt, for example because of another collision, the NT-TRP may still receive UE1's report in PUCCH resource 5, reconstruct the report and cancel its effect in PUCCH resource 3, and hence successfully decode a replica of UE2's CSI report successfully as well.

It should be noted that the PUCCH resource pool methods found herein may be used for control signaling other than CSI reporting. In particular, NTN may benefit from configuring PUCCH resource pools for a diverse range of configurations for control signaling to alleviate the adverse effect of long propagation delays. PUCCH resource pool methods may also be employed for other systems such as terrestrial wireless systems.

Figure 13:
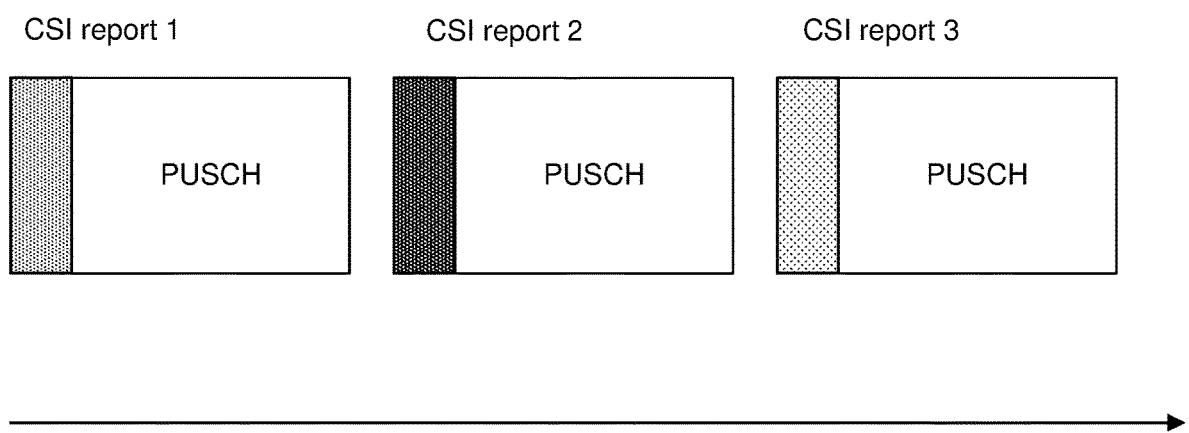
FIG. 13 is a schematic block diagram illustrating one embodiment of communications including transmitting CSI reports in extra PUSCH resources.

In various embodiments, a network allocates extra resources for a PUSCH such that a UE may use them for transmitting a UE-triggered CSI report. Specifically, FIG. 13 is a schematic block diagram illustrating one embodiment of communications 1300 including transmitting CSI reports in extra PUSCH resources. The communications 1300 may result in wasting resources and, hence, the extra PUSCH resources in a PUSCH occurrence may not be large. As a result, the extra resources in a PUSCH may not be sufficient for transmitting a whole CSI report.

In certain embodiments, similar to the concept of PUCCH resource pools, PUSCH resource pools may be configured for uplink transmissions. Those may include, but are not limited to, UE-triggered CSI reporting. PUSCH resource pool configurations may benefit from a larger degree of flexibility as the number of resources may be generally larger than those a PUCCH resource pool.

In some embodiments, diversity random access schemes may be applied to the use of PUSCH resource pools in a more flexible manner compared to PUCCH resource pools. As an example, if two UEs select resources randomly from a PUSCH resource pool for uplink transmissions, the selected resources may overlap, but only partially, hence allowing the receiving NT-TRP and/or gNB to potentially decode signals from one or both of the UEs.

In various embodiments, a PUSCH resource pool may be assigned different quality-of-service ("QoS") categories by configuration or specification, for example, by assigning different values of 5G QoS indicators ("5Qis"). An example of this may be to divide a CSI report into multiple parts, groups, and/or fragments and transmit each part, group, and/or fragment on resources with different QoS depending on a priority or significance of the part, group, and/or fragment. It should be noted that although resource pools for PUCCH and PUSCH are described herein, other types of resource pools are not precluded.

Figure 14:
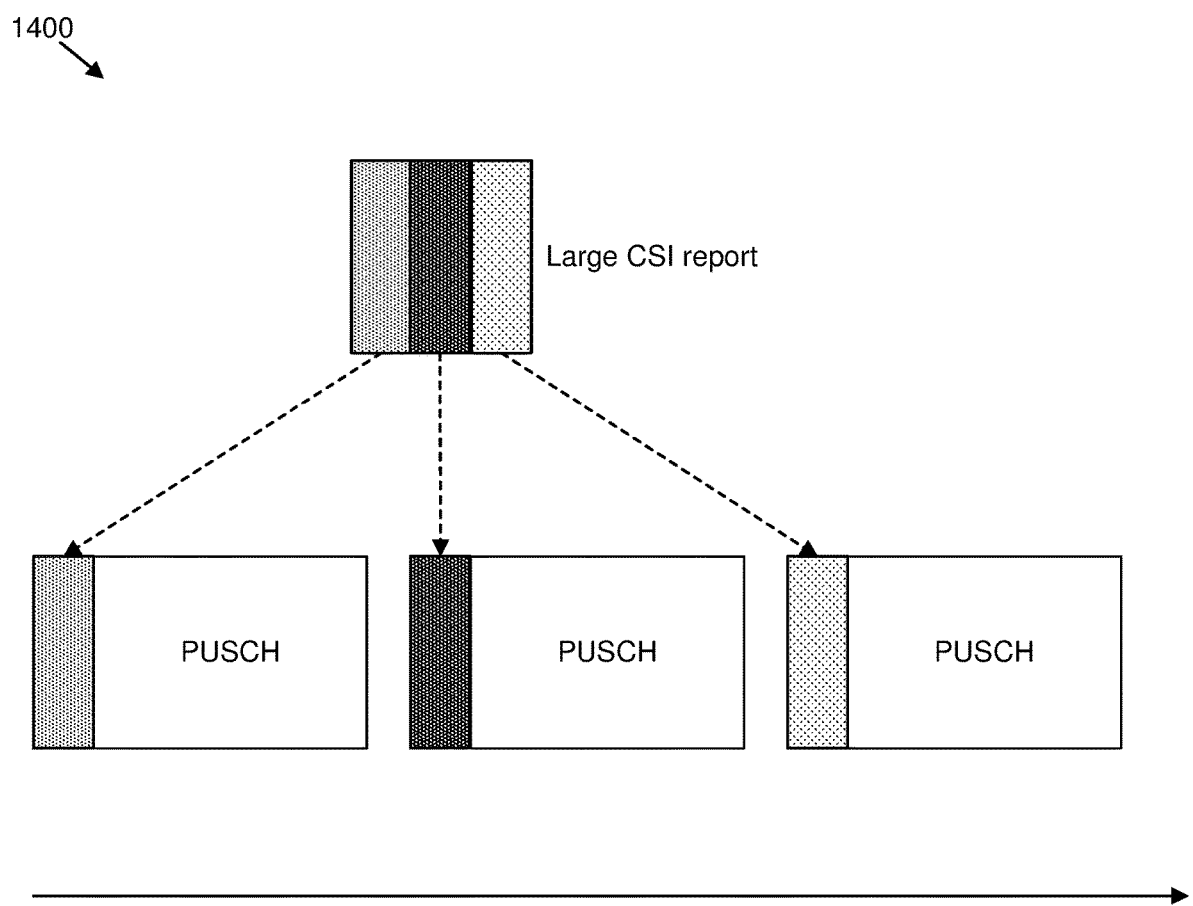
FIG. 14 is a schematic block diagram illustrating one embodiment of communications including fragmenting a large CSI report.

In certain embodiments, extra resources in a PUSCH (or similarly, the resources allocated to a PUCCH) may not be sufficient for transmitting a whole CSI report. In such embodiments, a UE may be able to send a fragment of a CSI report in a channel such as a PUSCH as shown in FIG. 14. Specifically, FIG. 14 is a schematic block diagram illustrating one embodiment of communications 1400 including fragmenting a large CSI report.

In some embodiments, if a payload of a CSI report is large, for example in the case of Type II codebooks, the payload may be fragmented. Alternatively, in various embodiments, a CSI report may be computed and divided into multiple parts or groups, where a first part and/or group may bear coarse CSI whereas a second part and/or group may bear fine CSI. A CSI report may include different parts, groups, and/or fragments that have different priority. For example, interpretation of a part and/or group including fine CSI may require knowledge of a coarse CSI included in another part and/or group. Different parts, groups, and/or fragments may also be significantly different in terms of size or bit-width. In any such cases, or for other purposes, a UE may decide (based on a specification, a configuration, or an implementation) to transmit a first part, group, and/or fragment of a CSI report in a first channel and a second part, group, and/or fragment of the CSI report in a second channel.

In certain embodiments, the first channel may be an allocated PUCCH, which may provide a more reliable communication, while the second channel is selected from a PUCCH resource pool, which may save resources. In such embodiments, the first part, group, and/or fragment may be associated with a higher reliability and the second part, group, and/or fragment may be associated with a lower reliability.

In various embodiments, the first channel may be an allocated PUSCH, which may provide a more reliable communication, while the second channel is selected from a PUSCH resource pool, which may save resources. In such embodiments, the first part, group, and/or fragment may be associated with a higher reliability and the second part, group, and/or fragment may be associated with a lower reliability.

In certain embodiments, the first channel may be an allocated PUCCH or selected from a PUCCH resource pool, while the second channel is a PUSCH or selected from a PUSCH resource pool. In such embodiments, the first part, group, and/or fragment may be associated with a higher reliability and/or require a smaller number of resources, while the second part, group, and/or fragment may be associated with a lower reliability and/or require a larger number of resources.

In some embodiments, the first part, group, and/or fragment may be transmitted as a whole, while the second part, group, and/or fragment may be further fragmented to be transmitted on different channels. In such embodiments, the first part, group, and/or fragment may require a smaller number of resources while the second part, group, and/or fragment may require a larger number of resources.

In various embodiments, the first part, group, and/or fragment may be transmitted to the network, while the second part, group, and/or fragment may be omitted. In such embodiments, the first part, group, and/or fragment may be associated with a higher priority and the second part, group, and/or fragment may be associated with a lower priority. It should be noted that while embodiments described herein may be useful for Type II codebooks, the scope is not limited to Type II codebooks.

In some embodiments, CSI reporting methods may be based on a configuration by a network sent to a UE via an NT-TRP, a gNB, or the like. In various embodiments, additional signaling for a UE may be used to indicate satisfaction of a condition to the UE or request a new CSI reporting configuration for UE-triggered reporting. This indication and/or request may be included in a CSI report.

In certain embodiments, a UE method may include the following steps: 1) a UE evaluates a quantity (e.g., BLER, RSRP, etc.); 2) is the quantity above and/or below a threshold?; 3) if yes: send a request message for changing a configuration to a NT-TRP; and 4) if no: continue the loop.

In some embodiments, a UE evaluates a CSI quantity, such as a CQI, an RSRP, an SINR, an RSSI, or a performance quantity such as a BLER or a hypothetical BLER according to a specification or configuration. In such embodiments, the UE performs a computation on the CSI quantity or performance quantity. For example, the UE compares the quantity with a threshold. If the quantity is above or below the threshold according to a specification or configuration, the UE includes an indication and/or request message in a report to the network. This report may be a CSI report. For example, a CSI report may be configured as described herein.

In embodiments described herein, additional signaling may assist a network with updating configurations and similar functionalities that are conventionally left to implementation in terrestrial wireless systems. For example, upon receiving an indication and/or request that a BLER of a UE is below a threshold, the network may change CSI resource and reporting configurations for the UE to adapt communications to new conditions.

In various embodiments, a UE receives a CSI reporting configuration as described in other embodiments herein. The configuration may include the following parameters for a UE-triggered indication and/or request: RequestCriterionList: SEQUENCE {reqCriterion #1, reqCriterion #2, . . . , reqCriterion #m}. Here, m is the number of indication and/or request criterion parameters for CSI reporting. An indication and/or request criterion may include at least two parameters: 1) a CSI quantity (e.g., CQI, RSRP, SINR, RSSI, etc.) or a performance quantity (e.g., BLER, hypothetical BLER, etc.); and/or 2) a threshold. The indication and/or request criterion may also include a parameter indicating that an indication and/or request message is included in the CSI report if the quantity is above or below the threshold.

Figure 15:
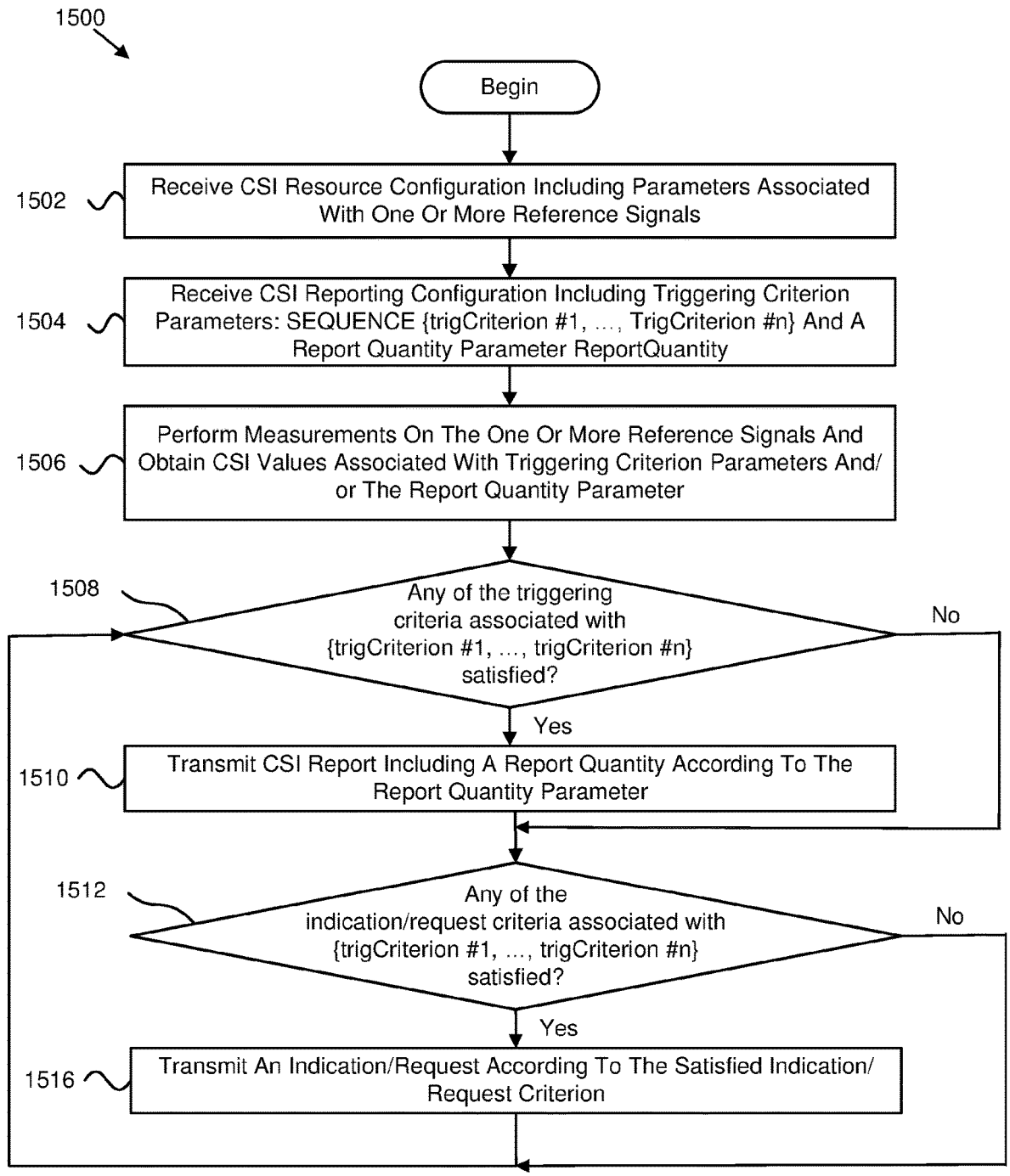
FIG. 15 is a flow chart diagram illustrating one embodiment of a method at a UE with additional signaling.

FIG. 15 is a flow chart diagram illustrating one embodiment of a method 1500 at a UE with additional signaling.

In step 1502, a UE receives a CSI resource configuration. The CSI resource configuration may include parameters similar to a CSI resource configuration in a legacy system. In certain embodiments, the CSI resource configuration may be enhanced to include parameters specific to a proposed UE method. Once the UE receives the CSI resource configuration, it may obtain information about resources from which the UE may perform measurements and obtain CSI. The CSI resource configuration may be associated with transmission of CSI-RS, SS/PBCH blocks, or other reference signals.

In step 1504, the UE receives a CSI reporting configuration. The configuration may include parameters similar to a CSI reporting configuration in a legacy system and/or parameters specific to embodiments described herein. In particular, the CSI reporting configuration may include one or more parameters that indicate to the UE that the reporting configuration configures a CSI reporting of a type that may be called UE-centric, UE-triggered, aperiodic UE-centric, aperiodic UE-triggered, or the like. The reporting configuration may also include parameters indicating criteria for triggering a CSI reporting. Examples of the triggering criteria are described herein. The criterion parameters may include a sequence and/or list such as SEQUENCE {trigCriterion #1, trigCriterion #2, trigCriterion #n}, where n is the number of criterion parameters in the CSI reporting configuration. The parameter n may be variable or constant according to a specification. The CSI reporting may further include one or more parameters such as a parameter reportQuantity that indicates to the UE which CSI values should be computed and transmitted to the network.

In some embodiments, a reporting configuration may include parameters indicating criteria for transmitting an indication and/or request associated with a CSI quantity or a performance quantity. The criterion parameters may be in a sequence and/or list such as SEQUENCE {reqCriterion #1, reqCriterion #2, . . . , reqCriterion #m}. The parameter m may be variable or constant according to a specification.

In step 1506, the UE performs measurements on the reference signals configured by the CSI resource configuration to obtain CSI values. The CSI values may be associated with the report quantity parameter reportQuantity in the CSI reporting configuration. For example, if the reportQuantity includes transmitting a CRI, a SSBRI, a RI, a PMI, a CQI, a RSRP, a RSRQ, and/or a SINR, the UE may compute such parameter based on measurements on the reference signals. Furthermore, the UE may compute a CSI value associated with a CSI criterion parameter in the CSI reporting configuration. For example, if the report quantity parameter indicates a PMI and a criterion parameter indicates a change in a CQI or an RSRP above a threshold, the UE may compute a PMI and a CQI or an RSRP in step 1506.

In certain embodiments, if a criterion parameter indicates to the UE that it needs to obtain other information (e.g., information of the UE's mobility from a GPS or a GNSS), the UE may obtain the information at this step for examining the associated criterion in step 1508. Measurements associated with indication and/or request criteria may also be performed at this step.

In step 1508, the UE examines whether any of the criteria determined by the criterion parameters in the CSI reporting configuration is satisfied. A criterion may indicate that a CSI report should be transmitted if a CSI value changes larger than a threshold, a CSI value and/or indicator changes by any value, the UE has a mobility parameter beyond a threshold, a maximum time interval has passed since the last CSI reporting, or the like. In some embodiments, the UE may examine whether all of the criteria determined by the criterion parameters are satisfied. Whether the UE should examine satisfaction of any or all of the criteria may be determined by a standard specification, a configuration, a signaling, or the like. If a triggering condition based on the criterion parameters is satisfied, the UE may proceed to step 1510 to transmit a CSI report. Otherwise, the UE may not proceed to step 1510.

In step 1510, upon determining that a triggering condition was satisfied in step 1508, the UE may transmit a CSI report as determined by the CSI reporting configuration. In particular, a report including one or more report quantities as determined by the parameter reportQuantity in the CSI reporting configuration may be reported to the network. In certain embodiments, the CSI reporting configuration includes multiple values of reportQuantity associated with multiple triggering criteria. In such embodiments, the UE may transmit a CSI report including a report quantity associated with the triggering condition that was satisfied.

In step 1512, the UE examines whether any of the criteria determined by the criterion parameters associated with indication and/or request messaging is satisfied. A criterion may indicate that a CSI quantity or a performance quantity is above or below a threshold. In some embodiments, a UE may examine whether all of the criteria determined by the criterion parameters are satisfied. Whether the UE should examine satisfaction of any or all of the criteria may be determined by a standard specification, a configuration, a signaling, or the like. If a condition based on the criterion parameters is satisfied, the UE may proceed to step 1514 to transmit an indication and/or request message. Otherwise, the UE may not proceed to step 1514.

In step 1514, upon determining that a condition was satisfied in step 1512, the UE may transmit an indication and/or request message according to the indication and/or request criterion that was satisfied in step 1512. It should be noted that any such indication and/or request message may be included in the CSI report produced in step 1510 or included in a separate report message. Similarly, the rest of the steps associated with receiving configurations and transmitting a report message may or may not be combined with a CSI reporting. For example, a network may configure a UE with separate configurations for CSI reporting and indication and/or request reporting, allocate separate resources for each, or otherwise control the procedures separately.

It should be noted that the different steps described herein may be performed in any order.

Moreover, it should be noted that each configuration may be provided by one or more configurations in practice. An earlier configuration may provide a subset of parameters while a later configuration may provide another subset of parameters. In various embodiments, a later configuration may override values provided by an earlier configuration or a pre-configuration.

In certain embodiments, a configuration may be provided by radio resource control ("RRC") signaling, medium-access control ("MAC") signaling, a physical layer signaling such as a downlink control information ("DCI") message, a combination thereof, or other methods. A configuration may include a pre-configuration or a semi-static configuration provided by the standard, by the vendor, and/or by the network/operator. Each parameter value received through a configuration or indication may override previous values for a similar parameter.

As may be appreciated, despite an emphasis on non-terrestrial networks herein, embodiments are not limited in scope to non-terrestrial networks. Similar embodiments can be used in other communication systems such as cellular systems, wireless local area networks ("WLANs"), and so forth.

Furthermore, example ASN.1 codes found herein are not to limit scope, but are examples. Aspects of the example ASN.1 codes, including the identifiers, names, structures, fields, parameters, range of values, options, and so forth are not meant to limit scope As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

Figure 16:
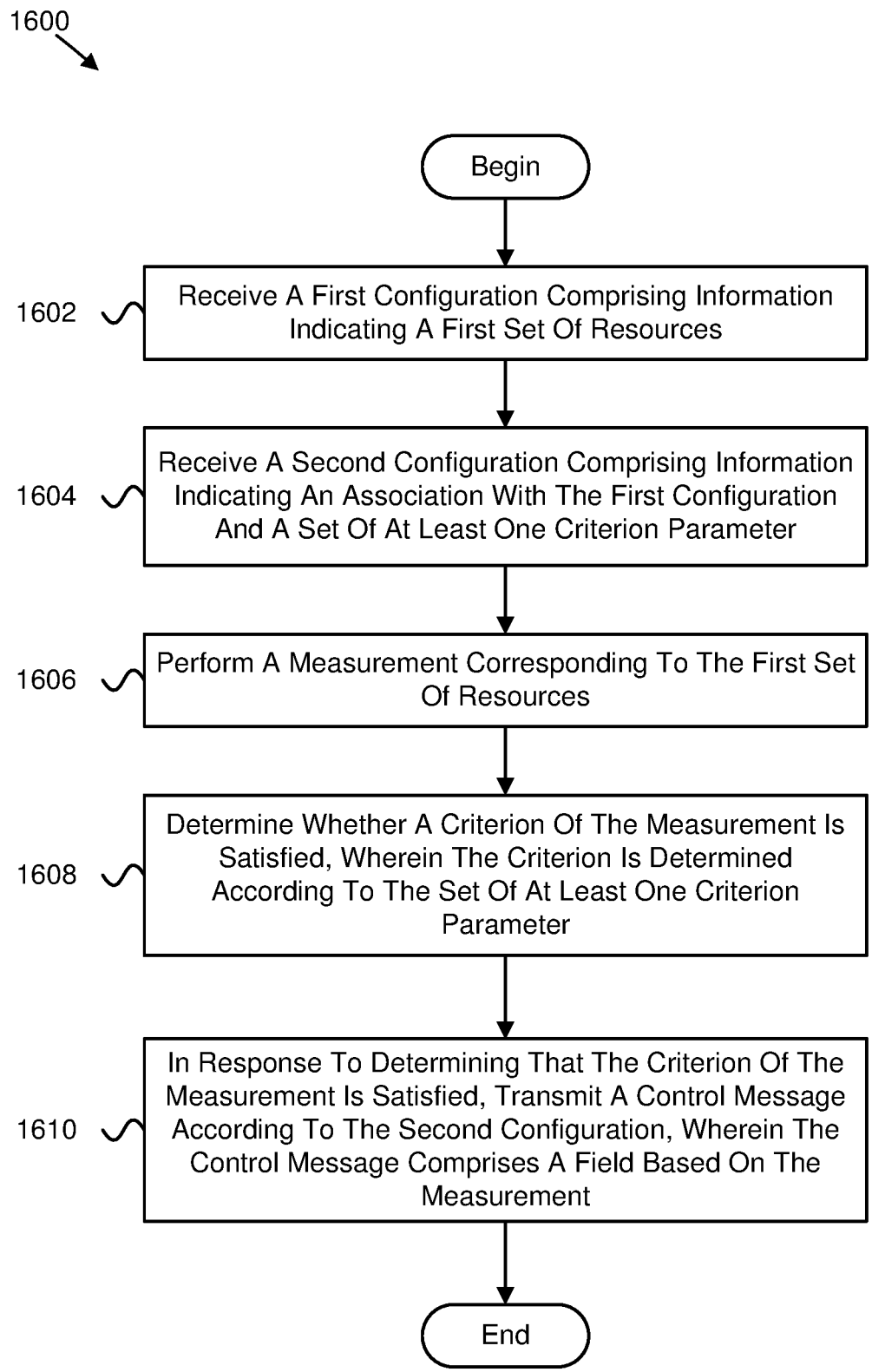
FIG. 16 is a flow chart diagram illustrating one embodiment of a method for measuring resources based on a criterion.

FIG. 16 is a flow chart diagram illustrating one embodiment of a method 1600 for measuring resources based on a criterion. In some embodiments, the method 1600 is performed by an apparatus, such as the remote unit 102. In certain embodiments, the method 1600 may be performed by a processor executing program code, for example, a microcontroller, a microprocessor, a CPU, a GPU, an auxiliary processing unit, a FPGA, or the like.

In various embodiments, the method 1600 includes receiving 1602, at a wireless device, a first configuration including information indicating a first set of resources. In some embodiments, the method 1600 includes receiving 1604 a second configuration including information indicating an association with the first configuration and a set of at least one criterion parameter. In certain embodiments, the method 1600 includes performing 1606 a measurement corresponding to the first set of resources. In various embodiments, the method 1600 includes determining 1608 whether a criterion of the measurement is satisfied. The criterion is determined according to the set of at least one criterion parameter. In some embodiments, the method 1600 includes, in response to determining that the criterion of the measurement is satisfied, transmitting 1610 a control message according to the second configuration. The control message includes a field based on the measurement.

In certain embodiments, the wireless device comprises a user equipment. In some embodiments, the first set of resources comprises a set of channel state information reference signal resources, a set of synchronization signal and physical broadcast channel block resources, or a combination thereof. In various embodiments, the second configuration comprises an indication to transmit a channel state information report in association with the set of at least one criterion parameter.

In one embodiment, a criterion parameter in the set of at least one criterion parameter comprises a criterion type and an additional parameter. In certain embodiments: the criterion type indicates to perform channel state information reporting in response to an amount of change of a channel state information parameter; the additional parameter comprises a threshold; and determining whether the criterion is satisfied comprises determining whether the amount of change of the channel state information parameter is greater than the threshold. In some embodiments: the criterion type indicates to perform channel state information reporting in response to a change of a channel state information parameter; and determining whether the criterion is satisfied comprises determining whether the channel state information parameter changes.

In various embodiments: the criterion type indicates to perform channel state information reporting in response to a movement of the wireless device; the additional parameter comprises a threshold; and determining whether the criterion is satisfied comprises determining whether the movement of the wireless device is greater than the threshold. In one embodiment: the criterion type indicates to perform channel state information reporting based on a maximum interval for consecutive channel state information reporting; the additional parameter comprises a threshold; and determining whether the criterion is satisfied comprises determining whether a time duration since a latest channel state information reporting is greater than the threshold.

In certain embodiments, the method 1600 further comprises: receiving a configuration of a resource pool, wherein the configuration comprises at least one resource; and selecting a resource of the at least one resource randomly for transmitting the control message. In some embodiments, the method 1600 further comprises: receiving a configuration of a resource pool, wherein the configuration comprises a plurality of resources; and selecting at least two resources of the plurality of resources randomly for transmitting at least two replicas of the control message.

In various embodiments, the method 1600 further comprises: receiving a configuration of a resource pool, wherein the configuration comprises a plurality of resources; and selecting at least two resources of the plurality of resources randomly for transmitting different fragments of the control message.

Figure 17:
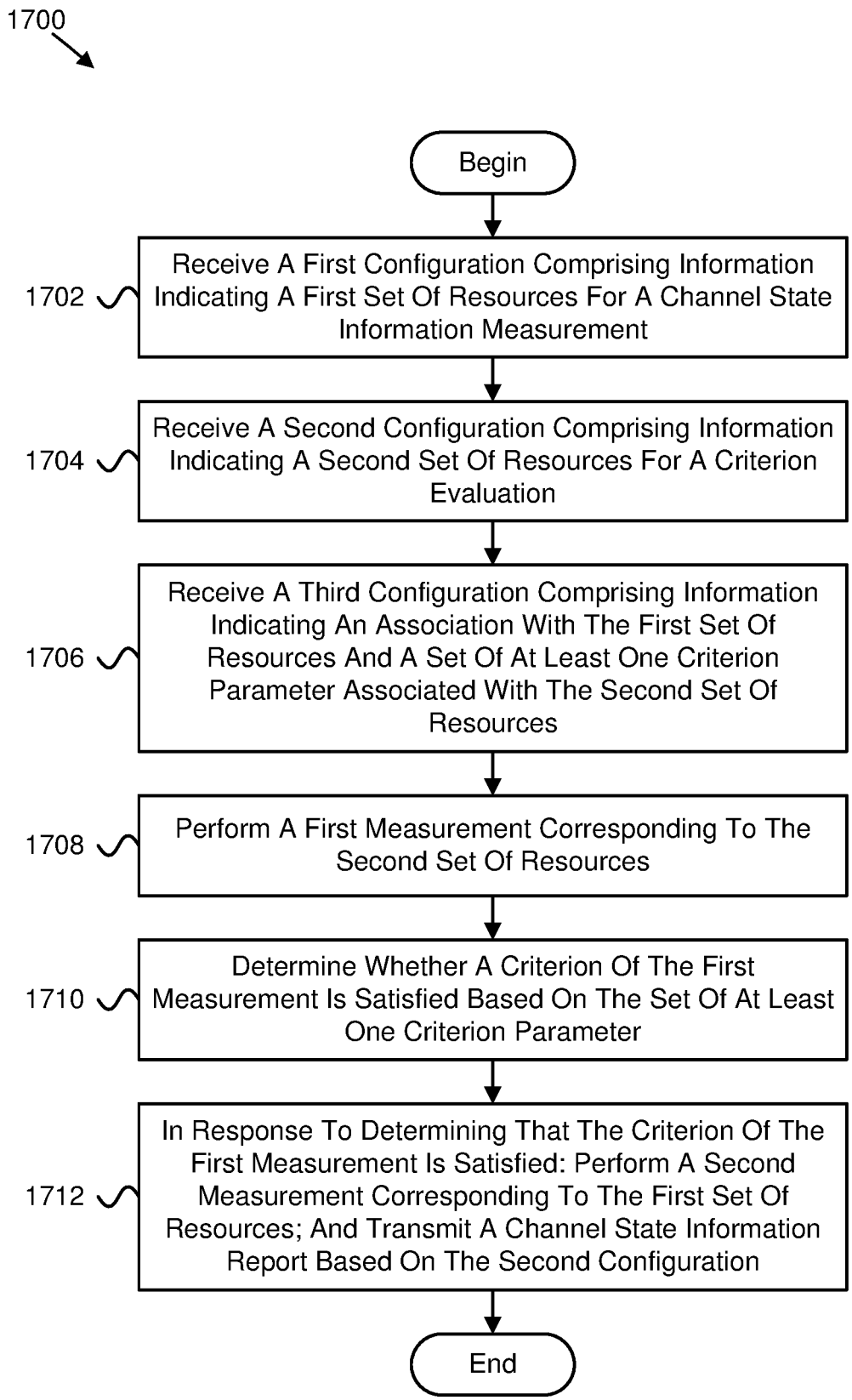
FIG. 17 is a flow chart diagram illustrating another embodiment of a method for measuring resources based on a criterion.

FIG. 17 is a flow chart diagram illustrating another embodiment of a method 1700 for measuring resources based on a criterion. In some embodiments, the method 1700 is performed by an apparatus, such as the remote unit 102. In certain embodiments, the method 1700 may be performed by a processor executing program code, for example, a microcontroller, a microprocessor, a CPU, a GPU, an auxiliary processing unit, a FPGA, or the like.

In various embodiments, the method 1700 includes receiving 1702, at a wireless device, a first configuration including information indicating a first set of resources for a channel state information measurement. In some embodiments, the method 1700 includes receiving 1704 a second configuration including information indicating a second set of resources for a criterion evaluation. In certain embodiments, the method 1700 includes receiving 1706 a third configuration including information indicating an association with the first set of resources and a set of at least one criterion parameter associated with the second set of resources. In various embodiments, the method 1700 includes performing 1708 a first measurement corresponding to the second set of resources. In some embodiments, the method 1700 includes determining 1710 whether a criterion of the first measurement is satisfied based on the set of at least one criterion parameter. In certain embodiments, the method 1700 includes, in response to determining that the criterion of the first measurement is satisfied: performing 1712 a second measurement corresponding to the first set of resources; and transmitting a channel state information report based on the second configuration.

In certain embodiments, the wireless device comprises a user equipment. In some embodiments, the first set of resources, the second set of resources, or a combination thereof comprises a set of channel state information reference signal resources, a set of synchronization signal and physical broadcast channel block resources, or a combination thereof. In various embodiments, the third configuration comprises an indication to transmit a channel state information report in association with the set of at least one criterion parameter.

In one embodiment, a method of a wireless device comprises: receiving a first configuration comprising information indicating a first set of resources; receiving a second configuration comprising information indicating an association with the first configuration and a set of at least one criterion parameter; performing a measurement corresponding to the first set of resources; determining whether a criterion of the measurement is satisfied, wherein the criterion is determined according to the set of at least one criterion parameter; and in response to determining that the criterion of the measurement is satisfied, transmitting a control message according to the second configuration, wherein the control message comprises a field based on the measurement.

In certain embodiments, the wireless device comprises a user equipment.

In some embodiments, the first set of resources comprises a set of channel state information reference signal resources, a set of synchronization signal and physical broadcast channel block resources, or a combination thereof.

In various embodiments, the second configuration comprises an indication to transmit a channel state information report in association with the set of at least one criterion parameter.

In one embodiment, a criterion parameter in the set of at least one criterion parameter comprises a criterion type and an additional parameter.

In certain embodiments: the criterion type indicates to perform channel state information reporting in response to an amount of change of a channel state information parameter; the additional parameter comprises a threshold; and determining whether the criterion is satisfied comprises determining whether the amount of change of the channel state information parameter is greater than the threshold.

In some embodiments: the criterion type indicates to perform channel state information reporting in response to a change of a channel state information parameter; and determining whether the criterion is satisfied comprises determining whether the channel state information parameter changes.

In various embodiments: the criterion type indicates to perform channel state information reporting in response to a movement of the wireless device; the additional parameter comprises a threshold; and determining whether the criterion is satisfied comprises determining whether the movement of the wireless device is greater than the threshold.

In one embodiment: the criterion type indicates to perform channel state information reporting based on a maximum interval for consecutive channel state information reporting; the additional parameter comprises a threshold; and determining whether the criterion is satisfied comprises determining whether a time duration since a latest channel state information reporting is greater than the threshold.

In certain embodiments, the method further comprises: receiving a configuration of a resource pool, wherein the configuration comprises at least one resource; and selecting a resource of the at least one resource randomly for transmitting the control message.

In some embodiments, the method further comprises: receiving a configuration of a resource pool, wherein the configuration comprises a plurality of resources; and selecting at least two resources of the plurality of resources randomly for transmitting at least two replicas of the control message.

In various embodiments, the method further comprises: receiving a configuration of a resource pool, wherein the configuration comprises a plurality of resources; and selecting at least two resources of the plurality of resources randomly for transmitting different fragments of the control message.

In one embodiment, an apparatus comprises a wireless device. The apparatus further comprises: a receiver that: receives a first configuration comprising information indicating a first set of resources; and receives a second configuration comprising information indicating an association with the first configuration and a set of at least one criterion parameter; a processor that: performs a measurement corresponding to the first set of resources; and determines whether a criterion of the measurement is satisfied, wherein the criterion is determined according to the set of at least one criterion parameter; and a transmitter that, in response to determining that the criterion of the measurement is satisfied, transmits a control message according to the second configuration, wherein the control message comprises a field based on the measurement.

In certain embodiments, the wireless device comprises a user equipment.

In some embodiments, the first set of resources comprises a set of channel state information reference signal resources, a set of synchronization signal and physical broadcast channel block resources, or a combination thereof.

In various embodiments, the second configuration comprises an indication to transmit a channel state information report in association with the set of at least one criterion parameter.

In one embodiment, a criterion parameter in the set of at least one criterion parameter comprises a criterion type and an additional parameter.

In certain embodiments: the criterion type indicates to perform channel state information reporting in response to an amount of change of a channel state information parameter; the additional parameter comprises a threshold; and the processor determining whether the criterion is satisfied comprises the processor determining whether the amount of change of the channel state information parameter is greater than the threshold.

In some embodiments: the criterion type indicates to perform channel state information reporting in response to a change of a channel state information parameter; and the processor determining whether the criterion is satisfied comprises the processor determining whether the channel state information parameter changes.

In various embodiments: the criterion type indicates to perform channel state information reporting in response to a movement of the wireless device; the additional parameter comprises a threshold; and the processor determining whether the criterion is satisfied comprises the processor determining whether the movement of the wireless device is greater than the threshold.

In one embodiment: the criterion type indicates to perform channel state information reporting based on a maximum interval for consecutive channel state information reporting; the additional parameter comprises a threshold; and the processor determining whether the criterion is satisfied comprises the processor determining whether a time duration since a latest channel state information reporting is greater than the threshold.

In certain embodiments: the receiver receives a configuration of a resource pool, wherein the configuration comprises at least one resource; and the processor selects a resource of the at least one resource randomly for transmitting the control message.

In some embodiments: the receiver receives a configuration of a resource pool, wherein the configuration comprises a plurality of resources; and the processor selects at least two resources of the plurality of resources randomly for transmitting at least two replicas of the control message.

In various embodiments: the receiver receives a configuration of a resource pool, wherein the configuration comprises a plurality of resources; and the processor selects at least two resources of the plurality of resources randomly for transmitting different fragments of the control message.

In one embodiment, a method of a wireless device comprises: receiving a first configuration comprising information indicating a first set of resources for a channel state information measurement; receiving a second configuration comprising information indicating a second set of resources for a criterion evaluation; receiving a third configuration comprising information indicating an association with the first set of resources and a set of at least one criterion parameter associated with the second set of resources; performing a first measurement corresponding to the second set of resources; determining whether a criterion of the first measurement is satisfied based on the set of at least one criterion parameter; and in response to determining that the criterion of the first measurement is satisfied: performing a second measurement corresponding to the first set of resources; and transmitting a channel state information report based on the second configuration.

In certain embodiments, the wireless device comprises a user equipment.

In some embodiments, the first set of resources, the second set of resources, or a combination thereof comprises a set of channel state information reference signal resources, a set of synchronization signal and physical broadcast channel block resources, or a combination thereof.

In various embodiments, the third configuration comprises an indication to transmit a channel state information report in association with the set of at least one criterion parameter.

In one embodiment, an apparatus comprises a wireless device. The apparatus further comprises: a receiver that: receives a first configuration comprising information indicating a first set of resources for a channel state information measurement; receives a second configuration comprising information indicating a second set of resources for a criterion evaluation; and receives a third configuration comprising information indicating an association with the first set of resources and a set of at least one criterion parameter associated with the second set of resources; a processor that: performs a first measurement corresponding to the second set of resources; and determines whether a criterion of the first measurement is satisfied based on the set of at least one criterion parameter; and a transmitter; wherein, in response to the processor determining that the criterion of the first measurement is satisfied: the processor performs a second measurement corresponding to the first set of resources; and the transmitter transmits a channel state information report based on the second configuration.

In certain embodiments, the wireless device comprises a user equipment.

In some embodiments, the first set of resources, the second set of resources, or a combination thereof comprises a set of channel state information reference signal resources, a set of synchronization signal and physical broadcast channel block resources, or a combination thereof.

In various embodiments, the third configuration comprises an indication to transmit a channel state information report in association with the set of at least one criterion parameter.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
receiving a first configuration comprising information indicating a first set of resources;
receiving a second configuration comprising information indicating an association with the first configuration and a set of at least one criterion parameter;
performing a measurement corresponding to the first set of resources;

determining whether a criterion of the measurement is satisfied, wherein the criterion is determined according to the set of at least one criterion parameter;

in response to determining that the criterion of the measurement is satisfied, transmitting a control message according to the second configuration, wherein the control message comprises a field based on the measurement;

wherein:
- a criterion parameter in the set of at least one criterion parameter comprises a criterion type and an additional parameter;
- the criterion type indicates to perform channel state information (CSI) reporting based on a maximum interval for consecutive CSI reporting; and
- the additional parameter comprises a threshold; and determining whether a time duration since a latest channel state information reporting is greater than the threshold.

2. The method of claim 1, wherein the first set of resources comprises a set of channel state information (CSI) reference signal resources, or a set of synchronization signal and physical broadcast channel (SS/PBCH) block resources, or both.

3. The method of claim 1, wherein the second configuration comprises an indication to transmit a channel state information (CSI) report in association with the set of at least one criterion parameter.

4. The method of claim 1, wherein:
the method further comprises determining whether the criterion is satisfied comprises determining whether an amount of change of a CSI parameter is greater than the threshold.

5. A user equipment (UE), comprising:
at least one memory; and
at least one processor coupled with the at least one memory and configured to cause the UE to:
receive a first configuration comprising information indicating a first set of resources;
receive a second configuration comprising information indicating an association with the first configuration and a set of at least one criterion parameter;
perform a measurement corresponding to the first set of resources;
determine whether a criterion of the measurement is satisfied, wherein the criterion is determined according to the set of at least one criterion parameter;
in response to determining that the criterion of the measurement is satisfied, transmit a control message according to the second configuration, wherein the control message comprises a field based on the measurement;
wherein:
- a criterion parameter in the set of at least one criterion parameter comprises a criterion type and an additional parameter;
- the criterion type indicates to perform channel state information (CSI) reporting based on a maximum interval for consecutive CSI reporting; and
- the additional parameter comprises a threshold; and
determine whether a time duration since a latest channel state information reporting is greater than the threshold.

6. The UE of claim 5, wherein the first set of resources comprises a set of channel state information (CSI) reference signal resources, or a set of synchronization signal and physical broadcast channel (SS/PBCH) block resources, or both.

7. The UE of claim 5, wherein the second configuration comprises an indication to transmit a channel state information (CSI) report in association with the set of at least one criterion parameter.

8. The UE of claim 5, wherein:
the at least one processor is configured to cause the UE to determine whether an amount of change of a CSI parameter is greater than a threshold change of the CSI parameter.

9. The UE of claim 5, wherein:
the at least one processor is configured to cause the UE apparatus to determine whether a channel state information parameter changes.

10. The UE of claim 5, wherein:
the at least one processor is configured to cause the UE to determine whether movement of the UE is greater than a threshold movement of the UE.

11. The UE of claim 5, wherein the at least one processor is configured to cause the UE to:
receive a configuration of a resource pool, wherein the configuration comprises at least one resource; and
select a resource of the at least one resource randomly for transmitting the control message.

12. The UE of claim 5, wherein the at least one processor is configured to cause the UE to:
receive a configuration of a resource pool, wherein the configuration comprises a plurality of resources; and
select at least two resources of the plurality of resources randomly for transmitting at least two replicas of the control message.

13. The UE of claim 5, wherein the at least one processor is configured to cause the UE to:
receive a configuration of a resource pool, wherein the configuration comprises a plurality of resources; and
select at least two resources of the plurality of resources randomly for transmitting different fragments of the control message.

14. A user equipment (UE), comprising:
at least one memory; and
at least one processor coupled with the at least one memory and configured to cause the UE to:
receive a first configuration comprising information indicating a first set of resources for a channel state information (CSI) measurement;
receive a second configuration comprising information indicating a second set of resources for a criterion evaluation;
receive a third configuration comprising information indicating an association with the first set of resources and a set of at least one criterion parameter associated with the second set of resources;
perform a first measurement corresponding to the second set of resources; and
determine whether a criterion of the first measurement is satisfied based on the set of at least one criterion parameter;
wherein, in response to the determining that the criterion of the first measurement is satisfied:
perform a second measurement corresponding to the first set of resources; and
transmit a CSI report based on the second configuration;
wherein:
a criterion parameter in the set of at least one criterion parameter comprises a criterion type and an additional parameter;

the criterion type indicates to perform channel state information (CSI) reporting based on a maximum interval for consecutive CSI reporting; and the additional parameter comprises a threshold; and determine whether a time duration since a latest channel state information reporting is greater than the threshold.

15. The UE of claim 14, wherein the first set of resources, or the second set of resources, or both comprises a set of CSI reference signal resources, or a set of synchronization signal and physical broadcast channel (SS/PBCH) block resources, or both.

16. The UE of claim 14, wherein the third configuration comprises an indication to transmit a CSI report in association with the set of at least one criterion parameter.

* * * * *